(12) United States Patent
Utykanski

(10) Patent No.: US 11,244,130 B2
(45) Date of Patent: Feb. 8, 2022

(54) SYSTEM FOR PROVIDING INTERIM CHARGING CAPABILITY FOR A MOBILE DEVICE

(71) Applicant: The Code Corporation, Draper, UT (US)

(72) Inventor: Phil Utykanski, Saratoga Springs, UT (US)

(73) Assignee: The Code Corporation, Murray, UT (US)

(*) Notice: Subject to any disclaimer, the term of this patent is extended or adjusted under 35 U.S.C. 154(b) by 0 days.

(21) Appl. No.: 16/667,723

(22) Filed: Oct. 29, 2019

(65) Prior Publication Data

US 2020/0065535 A1    Feb. 27, 2020

Related U.S. Application Data

(63) Continuation-in-part of application No. 15/630,807, filed on Jun. 22, 2017, now Pat. No. 10,474,859, which is a continuation of application No. 14/814,396, filed on Jul. 30, 2015, now Pat. No. 10,387,701, which is a continuation-in-part of application No. 14/741,213, filed on Jun. 16, 2015, now Pat. No. 9,679,177, which is a continuation-in-part of application No. 14/717,112, filed on May 20, 2015, now Pat. No. 10,133,902, which is a continuation-in-part of application No. 14/641,305, filed on Mar. 7, 2015, now Pat. No. 9,355,291.

(60) Provisional application No. 62/031,226, filed on Jul. 31, 2014.

(51) Int. Cl.
| | |
|---|---|
| *G06F 3/03* | (2006.01) |
| *G06K 7/10* | (2006.01) |
| *G06F 3/0354* | (2013.01) |
| *H02J 7/00* | (2006.01) |
| *G06K 7/14* | (2006.01) |
| *G06K 19/06* | (2006.01) |
| *H02J 7/34* | (2006.01) |

(52) U.S. Cl.
CPC ....... *G06K 7/10881* (2013.01); *G06F 3/0312* (2013.01); *G06F 3/0317* (2013.01); *G06F 3/03545* (2013.01); *G06K 7/146* (2013.01); *G06K 19/06018* (2013.01); *H02J 7/00* (2013.01); *H02J 7/0044* (2013.01); *H02J 7/342* (2020.01); *H02J 7/345* (2013.01)

(58) Field of Classification Search
None
See application file for complete search history.

(56) References Cited

U.S. PATENT DOCUMENTS

| | | | |
|---|---|---|---|
| 2009/0284216 A1* | 11/2009 | Bessa | H02J 7/0044 320/101 |
| 2010/0207575 A1* | 8/2010 | Pijnenburg | H02J 50/10 320/108 |
| 2013/0164949 A1* | 6/2013 | Riering-Czekalla | G06F 1/1632 439/39 |

* cited by examiner

*Primary Examiner* — Scott C Sun
(74) *Attorney, Agent, or Firm* — Thomas M. Hardman

(57) ABSTRACT

An interim charging system includes a docking station and a case for a mobile device. The case is magnetically secured to the docking station. The docking station includes a power source and a charger that charges the mobile device in the case.

16 Claims, 26 Drawing Sheets

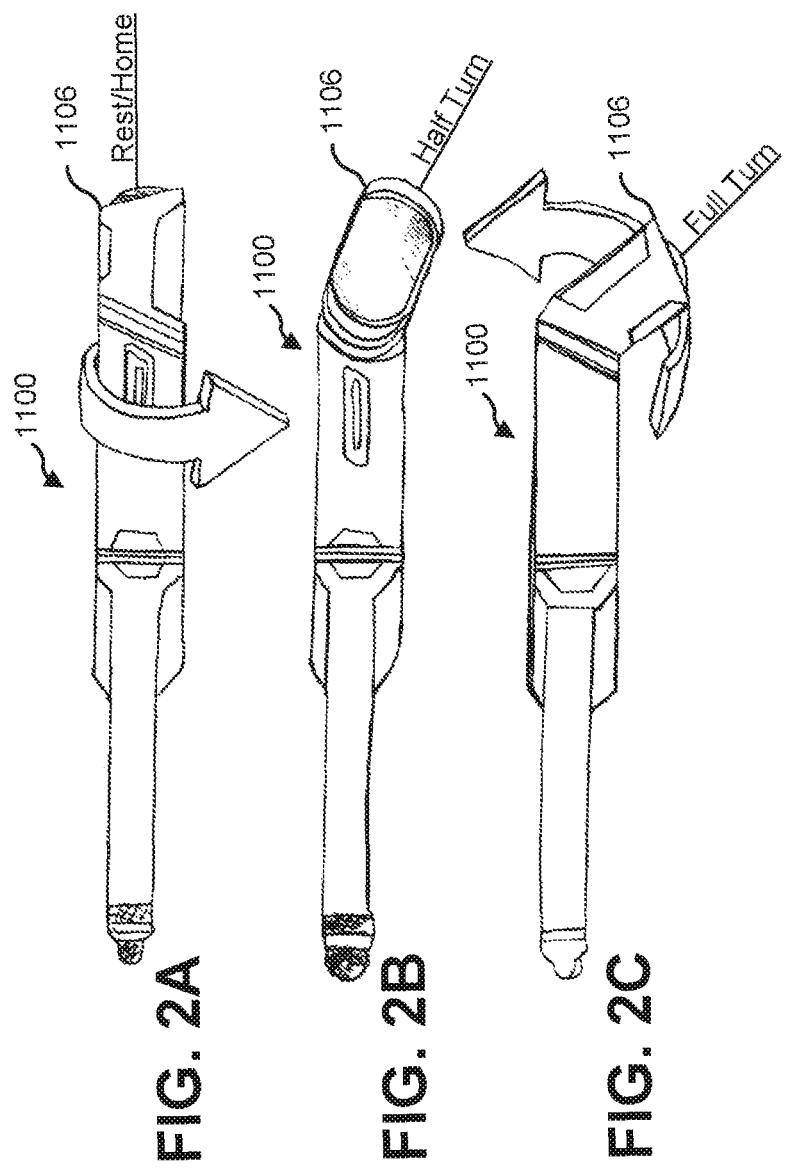

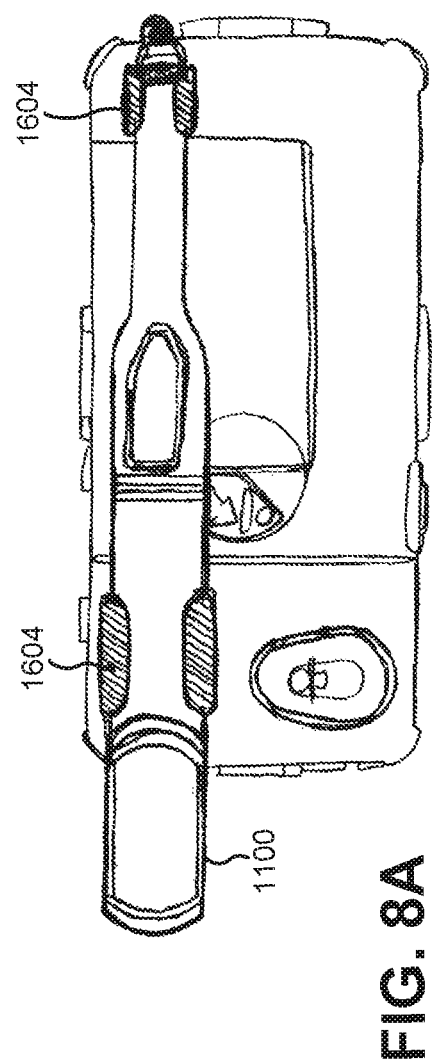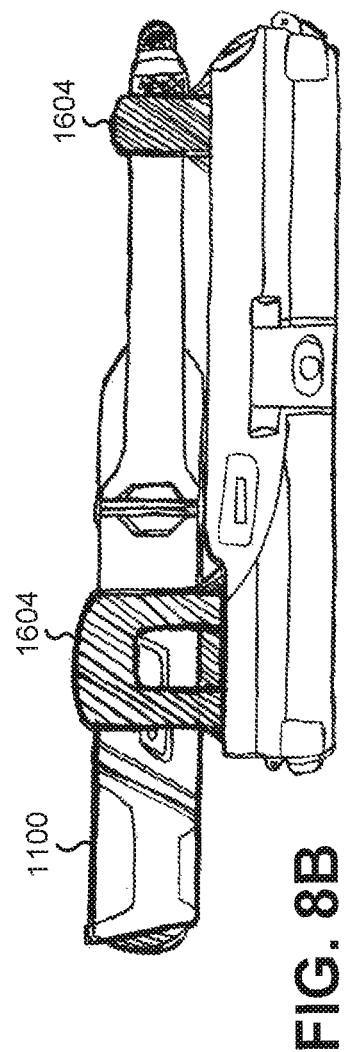
FIG. 8A
FIG. 8B

SYSTEM FOR PROVIDING INTERIM CHARGING CAPABILITY FOR A MOBILE DEVICE

CLAIMS OF PRIORITY

This application is a continuation-in-part of U.S. patent application Ser. No. 15/630,807 (the '807 Application), filed Jun. 22, 2017. The '807 Application is a continuation of U.S. patent application Ser. No. 14/814,396 (the '396 Application), filed Jul. 30, 2015, which issued as U.S. Pat. No. 10,387,701 on Aug. 20, 2019. The '396 Application is also a continuation-in-part of U.S. patent application Ser. No. 14/741,213 filed Jun. 16, 2015, which issued as U.S. Pat. No. 9,679,177 on Jun. 13, 2017. The '396 Application is also a continuation-in-part of U.S. patent application Ser. No. 14/717,112 filed on May 20, 2015, which issued as U.S. Pat. No. 10,133,902 on Nov. 20, 2018. The '396 Application is also a continuation-in-part of U.S. patent application Ser. No. 14/641,305 filed Mar. 7, 2015, which issued as U.S. Pat. No. 9,355,291 on May 31, 2016. The '396 Application also claims priority to U.S. Provisional Patent Application No. 62/031,226 filed Jul. 31, 2014. Each of the foregoing patent applications is hereby incorporated by reference in their entirety.

TECHNICAL FIELD

The present disclosure relates generally to a barcode reader. More specifically, the present disclosure relates to a barcode reader and a docking station for charging the barcode reader.

BACKGROUND

A barcode is an optical machine-readable representation of information. Devices for identifying or extracting information from barcodes are generally referred to as barcode readers or barcode scanners. An image-based barcode reader includes a camera for capturing an image of a barcode to be read. The camera includes a focusing lens that focuses light reflected from a target area onto a photo sensor array. Once an image of a barcode has been captured by the camera, a decoder processes the image and extracts the information contained in the barcode.

SUMMARY

In accordance with one aspect of the present disclosure, a system is disclosed for providing interim charging capability for a mobile device. The system includes a case for at least partially encapsulating the mobile device. The case includes a magnetic portion and a power coupling circuit coupling to charging contacts on the mobile device. The system also includes a docking station. The docking station includes a mating surface and a magnet located at the mating surface. The magnet magnetically secures the magnetic portion of the case to the docking station. The docking station also includes a power storage. The docking station also includes a device charging circuit coupling power from the power storage to the power coupling circuit to provide charging power to the mobile device while the mobile device is within the case. The docking station also includes a docking station charging circuit providing power to charge the power source when the docking station charging circuit is coupled to an external power source.

The case may include a case alignment feature and the docking station may include a docking station alignment feature. The case alignment feature and the docking station alignment feature may be complementary. A magnetic field between the magnet of the docking station and the magnetic portion of the case may secure the case alignment feature to the docking station alignment feature.

The case alignment feature may include a recess in the case and the docking station alignment feature may include a protrusion protruding from the mating surface. The recess may include the magnetic portion and the protrusion may include the magnet.

The device charging circuit may include an inductive charging power coil. The power coupling circuit may include an inductive charging receiving coil. The device charging circuit may couple power from the power storage to the power coupling circuit through the inductive charging power coil when the case is aligned with the docking station.

The device charging circuit may include a power contact and a ground contact. The power coupling circuit may include a power receiving contact and a ground connection contact. The device charging circuit may couple power from the power storage to the power coupling circuit through the power contact being in contact with the power receiving contact and the ground contact being in contact with the ground connection contact when the case is aligned with the docking station.

A magnetic attraction between the magnet and the magnetic portion may at least partially align the case with the docking station in a position where the device charging circuit becomes capable of coupling power to the power coupling circuit.

The device charging circuit may include an inductive charging power coil. The power coupling circuit may include an inductive charging receiving coil. The device charging circuit may couple power from the storage to the power coupling circuit through the inductive charging power coil when the case is aligned with the docking station.

The device charging circuit may include a power contact and a ground contact. The power coupling circuit may include a power receiving contact and a ground connection contact. The device charging circuit may couple power from the storage to the power coupling circuit through the power contact being in contact with the power receiving contact and the ground contact being in contact with the ground connection contact when the case is aligned with the docking station.

The docking station may include the mating surface. The magnet may be located at the mating surface. The docking station may also include a first side surface transverse to the mating surface, a second side surface opposite the first side surface and transverse to the mating surface, and a base surface between the first side surface and the second side surface and transverse to the mating surface.

A mating surface width between the first side surface and the second side surface may be greater than or equal to a case width of the case.

The first side surface may include a first side lip and the second side surface may include a second side lip. The first side lip and the second side lip may secure the case to the mating surface in a connected configuration.

The base surface may include a lip parallel to the back surface. The case may include a case base. The base surface may receive the case base in a connected configuration.

In accordance with another aspect of the present disclosure, a system is disclosed for providing interim charging capability for a mobile device. The system includes a case for at least partially encapsulating the mobile device. The case includes a magnet and a power coupling circuit coupling to charging contacts on the mobile device. The system also includes a docking station. The docking station includes a mating surface and a magnetic portion located at the mating surface. The magnet magnetically secures the magnetic portion of the case to the docking station. The docking station also includes a power storage, a device charging circuit coupling power from the power storage to the power coupling circuit to provide charging power to the mobile device while the mobile device is within the case, and a docking station charging circuit providing power to charge the power source when the retaining device charging circuit is coupled to an external power source.

The case may include a case alignment feature and the docking station may include a docking station alignment feature. The case alignment feature and the docking station alignment feature may be complementary. A magnetic field between the magnet of the case and the magnetic portion of the docking station may secure the case alignment feature to the docking station alignment feature.

The case alignment feature may include a recess in the case and the docking station alignment feature may include a protrusion protruding from the mating surface. The recess may include the magnet and the protrusion may include the magnetic portion.

The device charging circuit may include an inductive charging power coil. The power coupling circuit may include an inductive charging receiving coil. The device charging circuit may couple power from the storage to the power coupling circuit through the inductive charging power coil when the case is aligned with the docking station.

The device charging circuit may include a power contact and a ground contact. The power coupling circuit may include a power receiving contact and a ground connection contact. The device charging circuit may couple power from the storage to the power coupling circuit through the power contact being in contact with the power receiving contact and the ground contact being in contact with the ground connection contact when the case is aligned with the docking station.

A magnetic attraction between the magnet and the magnetic portion may at least partially align the case with the docking station in a position where the device charging circuit becomes capable of coupling power to the power coupling circuit.

The device charging circuit may include an inductive charging power coil. The power coupling circuit may include an inductive charging receiving coil. The device charging circuit may couple power from the storage to the power coupling circuit through the inductive charging power coil when the case is aligned with the docking station.

The device charging circuit may include a power contact and a ground contact. The power coupling circuit may include a power receiving contact and a ground connection contact. The device charging circuit may couple power from the storage to the power coupling circuit through the power contact being in contact with the power receiving contact and the ground contact being in contact with the ground connection contact when the case is aligned with the docking station.

The docking station may include the mating surface. The magnetic portion may be located at the mating surface. The docking station may also include a first side surface transverse to the mating surface, a second side surface opposite the first side surface and transverse to the mating surface, and a base surface between the first side surface and the second side surface and transverse to the mating surface.

A mating surface width between the first side surface and the second side surface may be greater than or equal to a case width of the case.

The first side surface may include a first side lip and the second side surface may include a second side lip. The first side lip and the second side lip may secure the case to the mating surface in a connected configuration.

The base surface may include a lip parallel to the back surface. The case may include a case base. The base surface may receive the case base in a connected configuration.

BRIEF DESCRIPTION OF THE DRAWINGS

FIGS. 2A-C illustrate an example of a stylus barcode reader with a barcode reader rotatably secured at one end of the stylus barcode reader.

FIGS. 8A and 8B illustrate rear and side views of an example of a case with a stylus barcode reader held in a docking mount on the rear surface of the case.

DETAILED DESCRIPTION

Figure 1A:
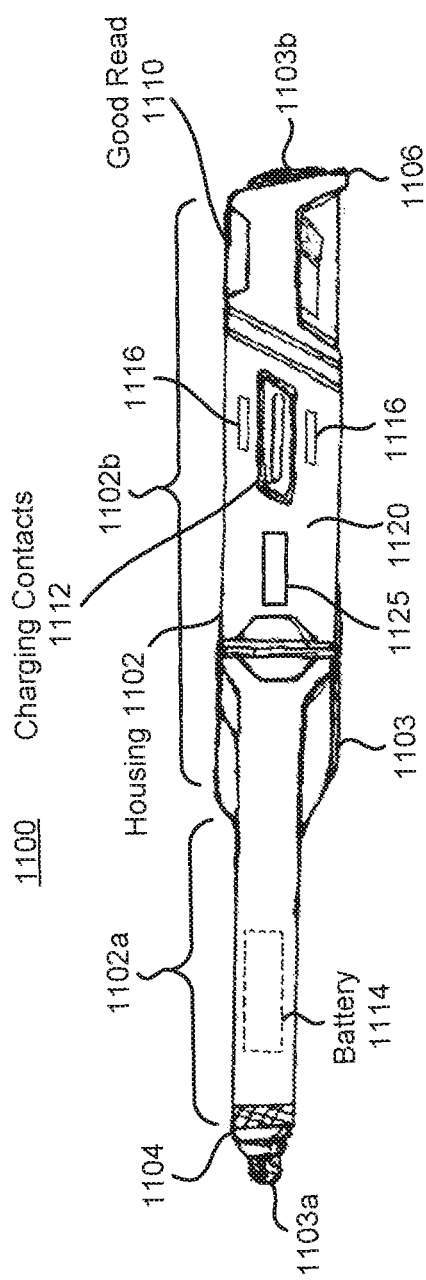
FIGS. 1A and 1B illustrate an example of a stylus barcode reader in accordance with one embodiment of the present disclosure.
Figure 1B:
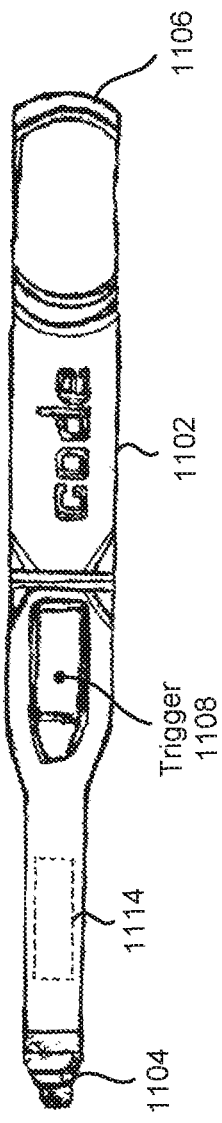

FIGS. 1A and 1B illustrate an example of a barcode reader 1100 in accordance with one embodiment of the present disclosure, the barcode reader being in the form of a stylus barcode reader.

The stylus barcode reader 1100 includes an elongated housing 1102. The elongated housing 1102 includes a first portion 1102a extending from a central point 1103 of the housing to a first end 1103a and a second portion 1102b extending from the central point 1103 to a second end 1103b. The first portion 1102a may be generally cylindrical with a diameter on the order of 5 to 10 mm that is approximately the diameter of a pen and is configured to be held by an operator in the same manner as an operator would hold a pen for writing. The second portion 1102b may also be generally cylindrical but may be of a larger diameter such that its interior region may be of sufficient size to accommodate the components of a barcode reader as discussed herein. The barcode reader 1100 may include a capacitive tip 1104 positioned at the first end 1103a of the housing 1102 for use as a stylus against a capacitive touch screen when an operator is holding the housing 1102 (holding the first portion 1102a) in a writing position.

A barcode reader 1106 may be positioned at the second end 1103b of the housing 1102 and may be used for reading barcodes. The barcode reader 1106 may be a laser reader or an imaging-based barcode reader which includes illumination light-emitting diodes (LEDs), targeting LEDs, a lens for focusing an image onto a photo sensor, readout circuitry and circuitry to deliver image data to a decoder, which will be explained in detail below.

The housing 1102 of the stylus barcode reader 1100 may also include a trigger button 1108, a good read signal indicator 1110, a battery 1114 within the housing 1102, and a plurality of charging contacts 1112.

The trigger button 1108, if pressed by a user, triggers reading of a barcode presented in a field of view of a camera of the barcode reader 1106. The good read signal indicator 1110 indicates successful reading and decoding of the barcode.

Figure 4:
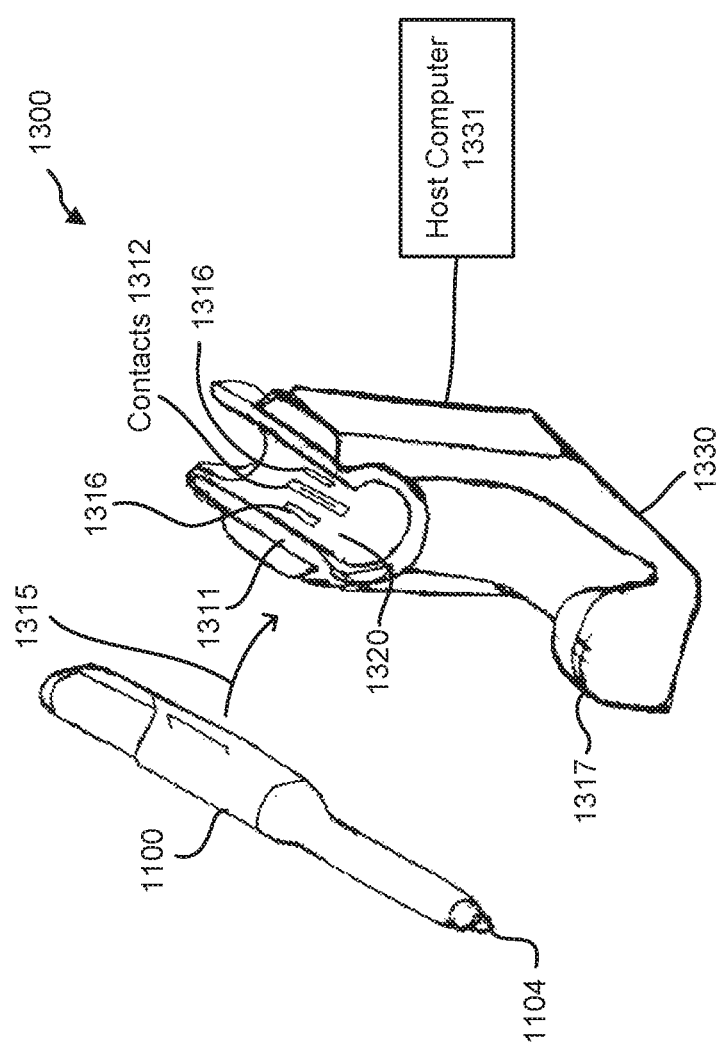
FIG. 4 shows the stylus barcode reader of FIGS. 1A and 1B and an example of a docking station for charging the stylus barcode reader.

The charging contacts 1112 are for providing charging power to the battery 1114 when coupled to mating contacts (e.g., charging contacts 1312 in FIG. 4) on a docking station (e.g., the docking station 1300 in FIG. 4). The charging contacts 1112 include at least one charging contact for power and at least one charging contact for ground. The charging contacts 1112 are coupled to mating contacts on the docking station when a mating surface 1120 of the stylus barcode reader 1100 is positioned against a corresponding mating surface (e.g., the surface 1320 in FIG. 4) of the docking station.

In one embodiment the battery 1114 may be a rechargeable battery such as a lithium ion battery which provides operating power for the barcode reader 1100 (including any wireless communication systems therein) for extended operation of the barcode reader 1100. Extended operation means that an operator may utilize the barcode reader 1100 for multiple scans during work flow that may last several hours.

In another embodiment, the battery 1114 may be a rechargeable battery or a super capacitor which provides operating power for the barcode reader 1100 for a limited number of barcode reads and storage of decoded data within the barcode reader 1100 for subsequent transfer to a docking station. The limited number of barcode reads may be less than 10 barcode reads, at which time the battery 1114 may have insufficient power for additional barcode reads. Transfer of decoded data to the docking station may require power coupled from the docking station to the barcode reader upon docking.

In each case, the battery 1114 may be charged through the charging circuitry included in the stylus barcode reader 1100 when the stylus barcode reader 1100 is coupled to a docking station.

The charging contacts 1112 may be power/data contacts which also provide power/data connectivity to a host device, for example, by using two or four contacts. The terms charging contacts and power/data contacts are used interchangeably. Data related to decoding of a barcode may be transferred via the charging contacts 1112. The power/data connectivity may be in compliance with a Universal Serial Bus (USB) protocol. The stylus barcode reader 1100 may include radio frequency (RF) circuitry for sending image data or decoded data of a barcode to a remote host.

The stylus barcode reader 1100 may further include a magnetic structure 1116 (e.g., one or more magnets) for holding the stylus barcode reader 1100 against a mating surface (e.g., the surface 1320 in FIG. 4) of the docking station when docked for charging. The charging contacts 1112 may be associated with the magnetic structure 1116 to provide a sharp snap when the stylus barcode reader 1100 is mated to the docking station as will be discussed in more detail herein.

The barcode reader 1106 may have a field of view extending along a longitudinal axis of the housing 1102. Alternatively, the barcode reader 1106 may have a field of view adjustable with respect to the housing 1102. As shown in FIGS. 2A-2C, the barcode reader 1106 may be rotatable about a longitudinal axis of the housing 1102 to adjust the field of view. FIG. 2B shows the barcode reader 1106 with a half turn and FIG. 2C shows the barcode reader 1106 with a full turn. The barcode reader 1106 may be connected to the housing 1102 with a swivel part and the connecting surfaces of the barcode reader 1106 and the housing 1102 are slanted such that the field of view of the barcode reader 1106 may be adjusted by rotating the barcode reader 1106 about the axis of the housing 1102.

Figure 11:
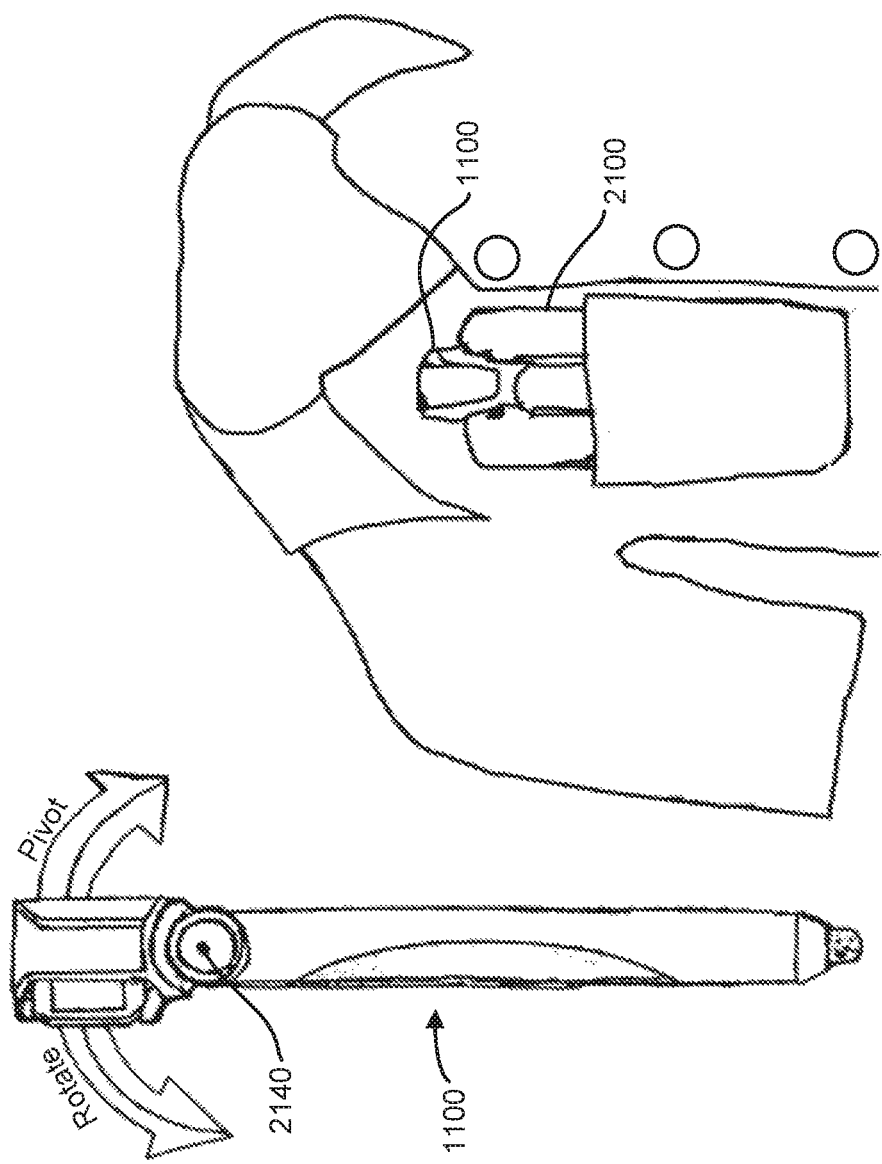
FIG. 11 illustrates an example of a stylus barcode reader and a docking station secured in a chest pocket of a shirt with the stylus barcode reader docked in for charging.

Alternatively, the barcode reader 1106 may be rotatable about an axis different from a longitudinal axis of the housing 1102 to adjust the field of view. The barcode reader may be rotatable about an axis perpendicular to a longitudinal axis of the housing 1102. The barcode reader 1106 may be connected to the housing 1102 with a hinge 2140 as shown in FIG. 11.

Figure 3A:
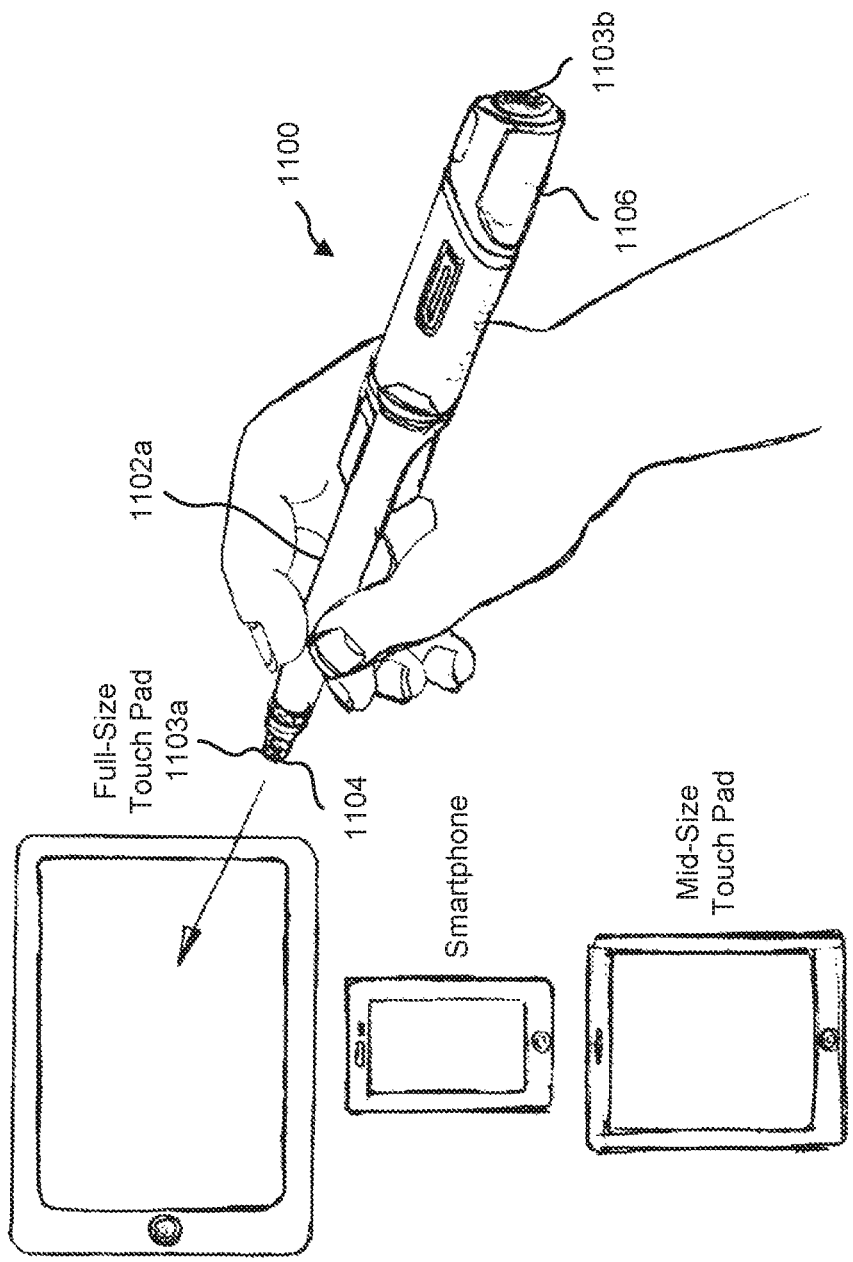
FIG. 3A depicts use of the stylus barcode reader shown in FIGS. 1A and 1B against a touch screen of a tablet or a smart phone.

FIG. 3A depicts using the stylus barcode reader 1100 in use with a touch screen of a computing device, such as a tablet, a smart phone, or the like. The stylus barcode reader 1100 may be gripped by an operator (i.e., gripping the first portion 1102a in the same manner as gripping a pen) and used as a stylus with the capacitive tip 1104 against the touch screen as shown in FIG. 3A. The capacitive tip 1104 may be replaceable and may be replaceable in different sizes depending on an application.

Figure 3B:
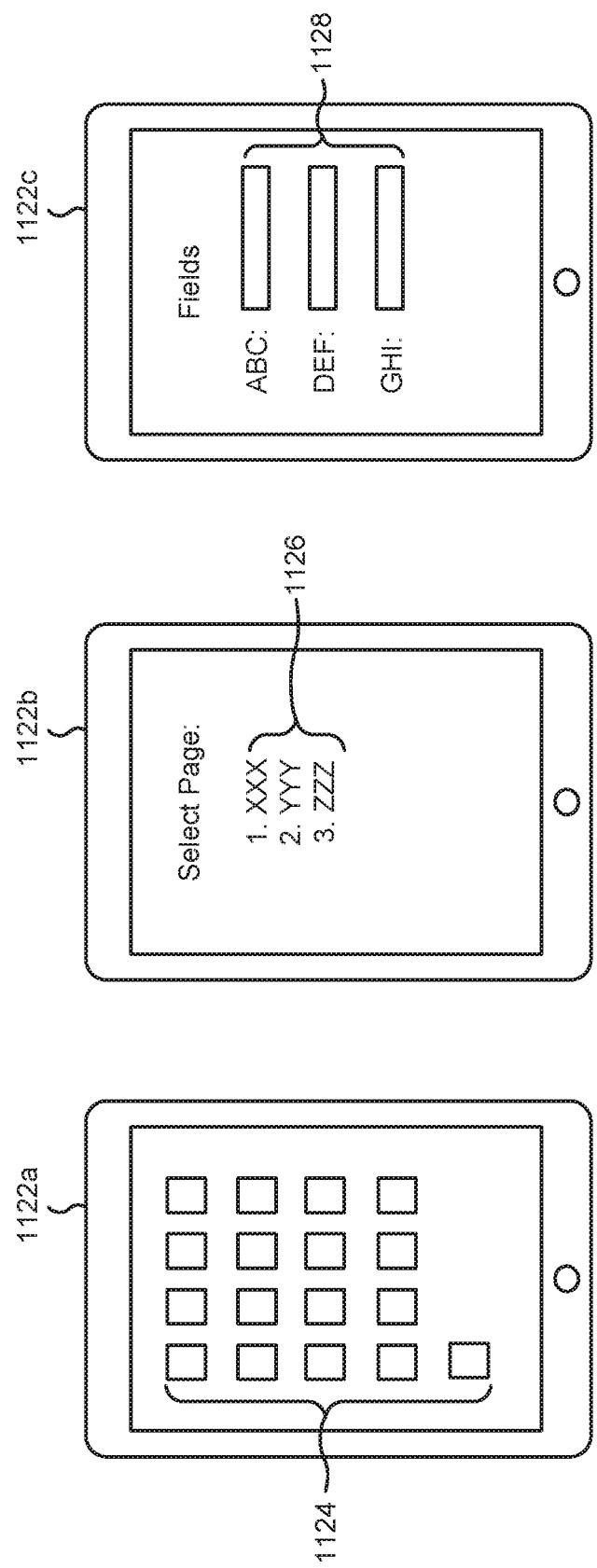
FIG. 3B depicts various ways in which the capacitive tip of the stylus barcode reader may be used to select applications, workflow screens and data fields.

Turning to FIG. 3B in conjunction with FIG. 3A, the capacitive tip 1104 at the first end 1103a may be utilized to, any of: i) select one of multiple applications 1124 into which barcode data is to be input as depicted on the display screen of a computing device 1122a; ii) select one of multiple workflow screens or pages 1126 within an application into which barcode data is to be input as depicted on the display screen of a computing device 1122b; and iii) select one of multiple data fields 1128 within an application into which barcode data is to be input as depicted on the display screen of a computing device 1122c.

Docking Station

FIG. 4 depicts a first embodiment of a docking station 1300 in accordance with an embodiment of the present disclosure, structured as a cradle style docking station for the stylus barcode reader 1100. The docking station 1300 may provide for charging the stylus barcode reader 1100 and/or interfacing data between the stylus barcode reader 1100 and a host computer 1331.

The cradle style docking station 1300 includes a partially open barrel-shaped component 1311 and a base 1330. The partially open barrel-shaped component 1311 may have a diameter being of the same size as the diameter of the second portion 1102b of the barcode reader 1100. The open portion of the barrel-shaped component 1311 may be at least 180 degrees (e.g. the spacing of the open portion is at least the diameter of the second portion 1102b of the barcode reader 1100) such that the barcode reader 1100 may be inserted into the open portion in the direction of arrow 1315. The base 1330 supports the partially open barrel-shaped component 1311 and supports a tip component 1317. The tip component 1317 supports the capacitive tip 1104 when the barcode reader 1100 is positioned within the partially open barrel-shaped component 1311 and ensures that the reader 1100 is correctly positioned within the partially open barrel-shaped component 1311 in the longitudinal direction.

The interior of the barrel-shaped component 1311 may include a plurality of charging/data contacts 1312. The charging/data contacts 1312 may include at least one charging contact for power and at least one charging contact for ground. If the docking station 1300 is further utilized for communication between the barcode reader 1100 and a host computer 1331 the charging/data contacts 1312 may further include two data contacts and the combination of the two data contacts and the power and ground contacts may comply with the USB standard.

The charging/data contacts 1312 are coupled to corresponding charging contacts 1112 on the stylus barcode reader 1100 when the stylus barcode reader 1100 is positioned within the partially open barrel-shaped component 1311, against a mating surface 1320 of the partially open barrel-shaped component 1311, and longitudinally positioned with the capacitive tip 1104 positioned within the tip component 1317.

The base 1330 may be configured to place the docking station 1300 on a horizontal surface (e.g., on a desk). In this case, the stylus barcode reader 1100 is positioned on top of the docking station 1300 when the docking station 1300 is positioned on the horizontal surface. Alternatively, the base 1330 may be configured to secure the docking station 1300 to a vertical surface. In that case, the mating surface 1320 may be generally vertical when the docking station 1300 is secured to the vertical surface, and a shape of the mating surface 1320 or the positioning structure may be adapted to support a weight of the stylus barcode reader 1100 when the stylus barcode reader 1100 is held against the mating surface 1320, for example, by the magnetic structure 1316.

The docking station 1300 may include a positioning structure for generally guiding alignment of the stylus barcode reader 1100 towards the mating surface 1320 of the docking station and, more specifically, generally guiding alignment of the stylus barcode reader 1100 towards the mating surface 1320 to a point where the magnetic fields (described herein) are able to take effect and provide precise alignment of the stylus barcode reader 1100 with the mating surface 1320 in a manner in which the charging contacts 1112 of the stylus barcode reader 1100 align with, and are in contact with, the charging/data contacts 1312 of the docking station 1300.

The positioning structure may be the sides of the partially open barrel-shaped component 1311 and the distance between the partially open barrel-shaped structure 1131 and the tip component 1317 which, in combination, guide the barcode reader 1100 into general alignment (in both the lateral and longitudinal directions) between the charging contacts 1112 of the stylus barcode reader 1100 and the charging/data contacts 1312 of the docking station 1300. In more detail, general alignment is a position wherein the stylus barcode reader 1100 is attracted to the mating surface 1320 by the magnetic field of the first magnet of the stylus barcode reader 1100 being attracted to the magnetic field of the first magnet of the docking station 1300 and the magnetic field of the second magnet of the stylus barcode reader 1100 being attracted to the magnetic field of the second magnet of the docking station 1300. The magnetic field may rotate and/or displace the stylus barcode reader 1100 (laterally or longitudinally) into alignment with the mating surface 1320 of the docking station 1300.

The positioning structure may include a cross section at a base end of the positioning structure adjacent to the mating surface 1320 that is larger than a cross section at a distal end of the positioning structure spaced away from the mating surface 1320. When the barcode reader is imprecisely aligned with the distal end, the positioning structure guides the barcode reader into precise alignment with the base end when the barcode reader is positioned against the mating surface 1320.

Referring to FIG. 1A in conjunction with FIG. 4, magnetic polarity may be used to ensure that correct charging contacts on the stylus barcode reader 1100 align with correct charging/data contacts 1312 on the docking station 1300 and provide the sharp snap to indicate that the stylus barcode reader 1100 is correctly mated to the docking station 1300.

The barcode reader 1100 may include a magnetic structure 1116, which may be two magnets, positioned adjacent to at least one of the charging contacts 1112. A first magnet may have a first polarity directed towards the mating surface 1320 of the docking station 1300 when the stylus barcode reader 1100 is positioned against the mating surface 1320 of the docking station 1300, and a second magnet may have an opposing polarity directed towards the mating surface 1320 of the docking station 1300 when the stylus barcode reader 1100 is positioned against the mating surface 1320 of the docking station.

The docking station 1300 may also include a corresponding magnetic structure 1316 (e.g., a first magnet with the opposing polarity and a second magnet with the first polarity), such that the stylus barcode reader 1100 may be i) attracted to and positioned against the mating surface 1320 of the docking station 1300 when a magnetic field of the first magnet of the stylus barcode reader 1100 is attracted to a magnetic field of the first magnet of the docking station 1300 and a magnetic field of the second magnet of the stylus barcode reader 1100 is attracted to a magnetic field of the second magnet of the docking station 1300, and ii) repelled from being positioned against the mating surface 1320 of the docking station 1300 when the magnetic field of the first magnet of the stylus barcode reader 1100 is repelled from the magnetic field of the second magnet of the docking station 1300 and the magnetic field of the second magnet of the stylus barcode reader 1100 is repelled from the magnetic field of the first magnet of the docking station 1300. This attraction/repulsion dynamic provides for the magnetic field to position (both laterally and rotationally) the barcode reader 1100 within the docking station with the charging contacts 1112 of the barcode reader properly aligned, and in contact with, the charging contacts 1312 of the docking station 1300.

One (or one set) of a plurality of charging contacts (for example charging contacts 1112 on the barcode reader 1100) may be flat and the other (or the other set) of a plurality of charging contacts (for example charging contacts 1312 on the docking station 1300) may be pins on a spring to apply pressure to the flat surface and maintain contact. The springs may have less power than the magnets such that the magnets may hold the two devices together while the springs hold the contacts together.

Figure 5A:
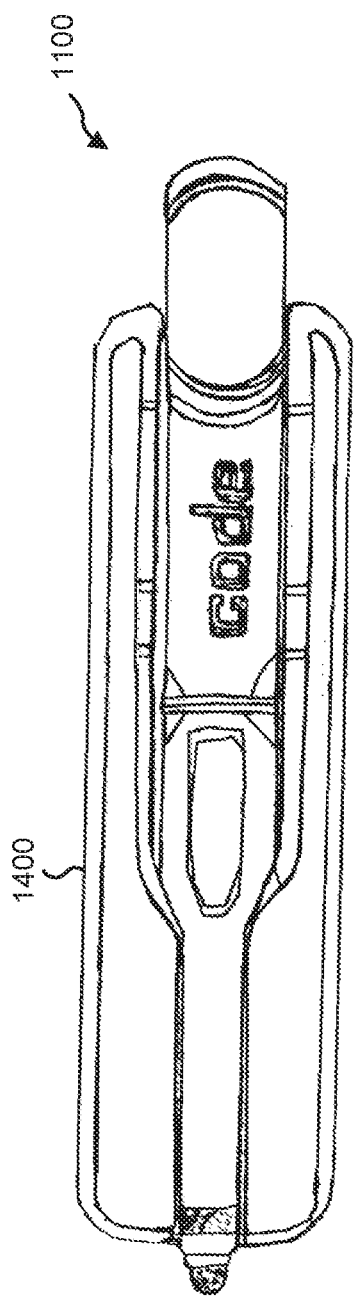
FIGS. 5A and 5B illustrate top and side views of another exemplary docking station with a stylus barcode reader docked in for charging.
Figure 5B:
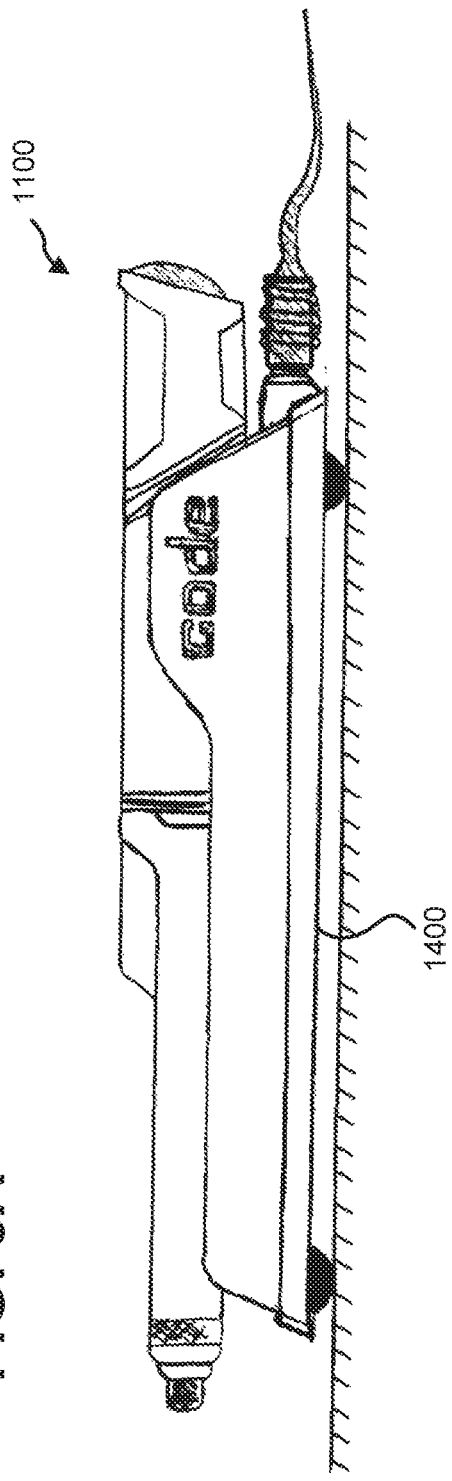

FIGS. 5A and 5B illustrate top and side views of another exemplary cradle style docking station 1400 with a stylus barcode reader 1100 docked in for charging. The docking station 1400 may be placed on a flat horizontal surface and the stylus barcode reader 1100 may be charged by an external power source when docked in the docking station 1400.

Figure 6:
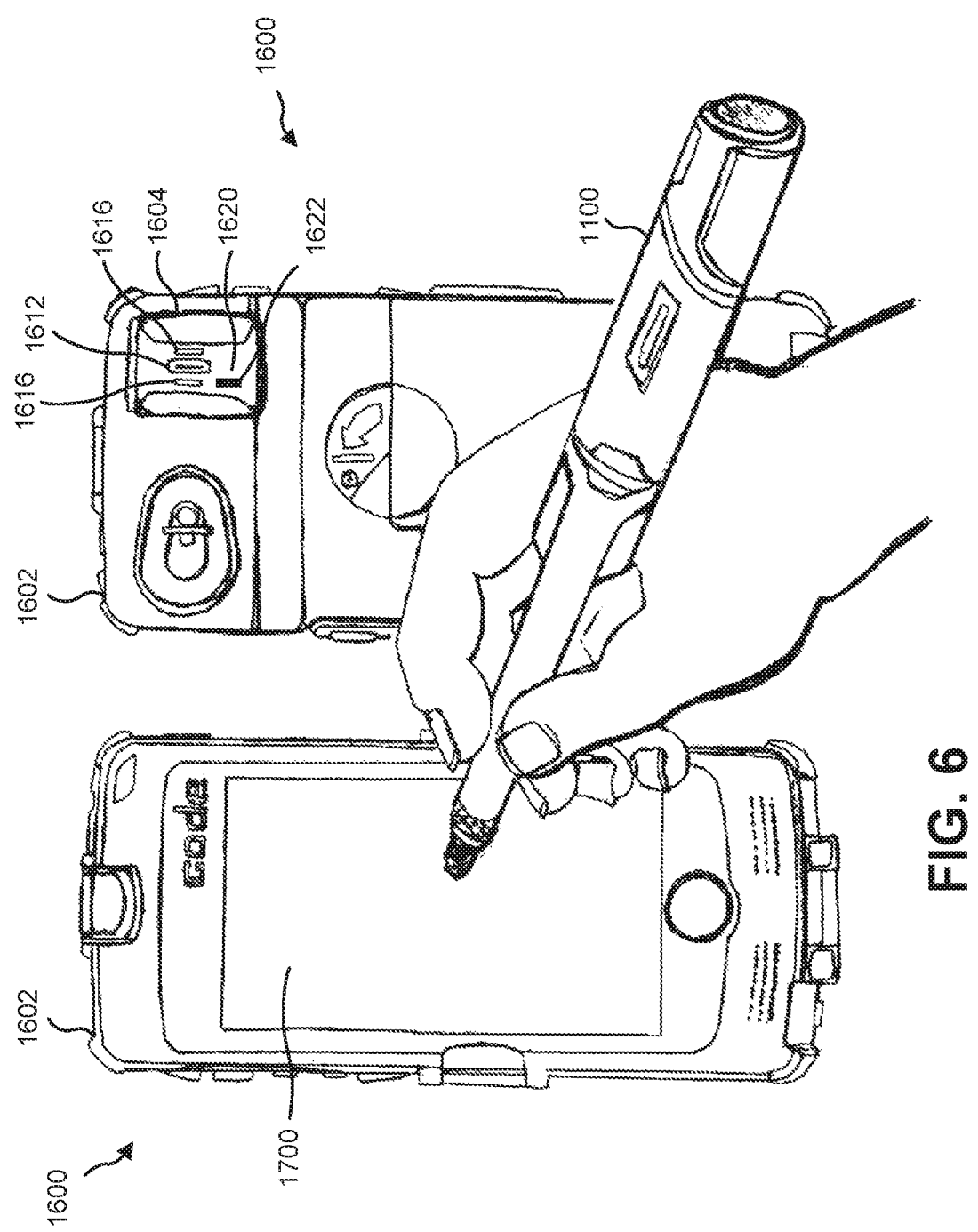
FIG. 6 illustrates front and rear views of an example of a case for a hand-held computing device with a docking mount to hold a stylus barcode reader on the back surface of the case.

FIG. 6 illustrates front and rear views of yet another exemplary docking station 1600 in accordance with the present disclosure. The docking station 1600 is configured as a case for a hand-held computing device. The docking station 1600 (i.e., case) may enclose, either partially or fully, a hand-held computing device 1700 (such as a smart phone, a tablet, or the like). The stylus barcode reader 1100 may be used with a computing device 1700 (similar to computing devices depicted in FIGS. 3A and 3B) having a touch screen while held in the case 1600 as shown in FIG. 6.

Figure 9:
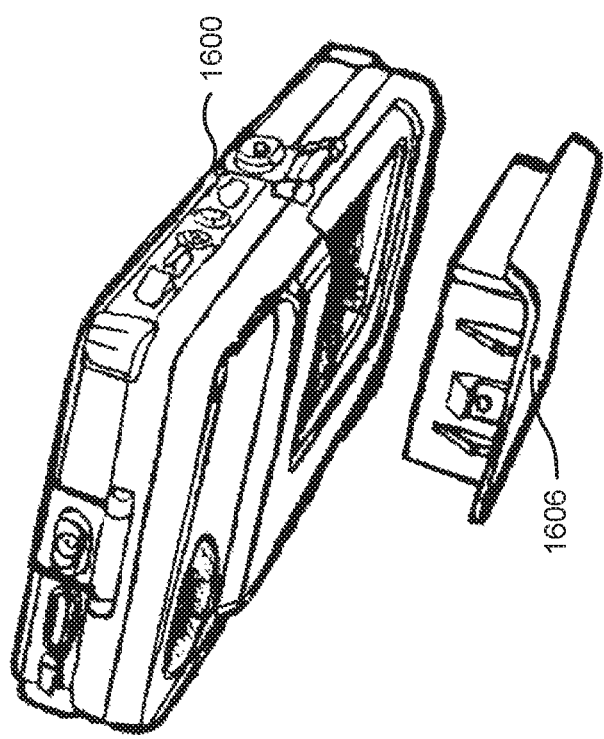
FIG. 9 illustrates an example of an electronic device case with a detachable battery.

The docking station 1600 may include a body 1602 and a battery 1606 (shown in FIG. 9). The body 1602 accommodates a hand-held computing device 1700.

The docking station 1600 includes a partially open barrel-shaped docking mount 1604 to hold a stylus barcode reader 1100 on the rear side of the case. Alternatively, the docking mount 1604 may be arranged on a side of the case 1600. The docking mount 1604 functions as a docking station for the stylus barcode reader 1100 and may include some or all of the features of the docking station 1300 disclosed above.

In more detail, the docking mount 1604 may include at least two charging contacts 1612 including at least one for power and at least one for ground. The charging contacts 1612 of the docking mount 1604 are coupled to charging contacts 1112 on the stylus barcode reader 1100 when the stylus barcode reader 1100 is positioned against a mating surface 1620 of the docking mount 1604 in a similar manner as described with respect to the docking station 1300 of FIG. 4.

Similar to the docking station 1300 of FIG. 4, the docking mount 1604 may include a positioning structure for generally guiding alignment of the stylus barcode reader 1100 towards the mating surface 1620 of the docking mount 1604 and, more specifically, generally guiding alignment of the stylus barcode reader 1100 towards the mating surface 1620 to a point where the magnetic fields (described herein) are able to take effect and provide precise alignment of the stylus barcode reader 1100 with the mating surface 1620 in a manner in which the charging contacts 1112 of the stylus barcode reader 1100 align with, and are in contact with, the charging contacts 1612 of the docking mount 1604.

Similar to the docking station 1300 in FIG. 4, the positioning structure may be the sides of the partially open barrel-shaped structure extending outward from the backside of the docking station 1600 (or side of the docking station 1600) which guides the barcode reader 1100 into general alignment between the charging contacts 1112 of the barcode reader 1100 and the charging contacts 1612 of the docking mount 1604.

Further, for general longitudinal and rotational alignment, the positioning structure may further include a ridge 1622 extended outward from the mating surface 1620 and may be configured to engage with a cavity or a recess 1125 formed in a housing 1102 of the stylus barcode reader 1100. The ridge 1622 may be smaller than the cavity to provide general alignment. Alternatively, the positioning structure may be a cavity extending into the mating surface 1620 of the docking mount 1604, and a corresponding ridge may be formed on the mating surface 1120 of the stylus barcode reader 1100.

The positioning structure may include a cross section at a base end of the positioning structure adjacent to the mating surface 1620 which is larger than a cross section at a distal end of the positioning structure spaced away from the mating surface 1620 such that when the barcode reader is imprecisely aligned with the distal end the positioning structure guides the barcode reader into precise alignment with the base end when the barcode reader is positioned against the mating surface 1620.

The docking mount 1604 may include a magnetic structure 1616 for holding the stylus barcode reader 1100 against the mating surface 1620. The magnetic structure 1616 may include one or more magnets. For example, the magnetic structure 1616 may include a first magnet with a north polarity directed towards the stylus barcode reader 1100 when the stylus barcode reader 1100 is positioned against the mating surface 1620, and a second magnet with a south polarity directed towards the stylus barcode reader 1100 when the stylus barcode reader 1100 is positioned against the mating surface 1620. The magnetic structure 1616 and the magnetic structure 1116 in the stylus barcode reader 1100 result in the stylus barcode reader 1100 i) being attracted to and positioned against the mating surface 1620 when a magnetic field of the first magnet of the stylus barcode reader 1100 is attracted to a magnetic field of the first magnet of the docking mount 1604 and a magnetic field of the second magnet of the stylus barcode reader 1100 is attracted to a magnetic field of the second magnet of the docking mount 1604, and ii) being repelled from being positioned against the mating surface 1620 when the magnetic field of the first magnet of the stylus barcode reader 1100 is repelled from the magnetic field of the second magnet of the docking mount 1604 and the magnetic field of the second magnet of the stylus barcode reader 1100 is repelled from the magnetic field of the first magnet of the docking mount 1604.

Figure 10:
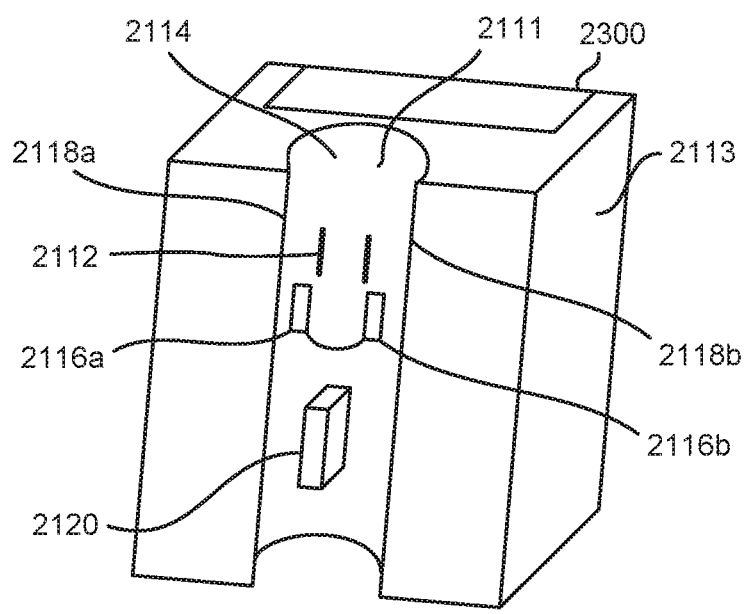
FIG. 10 illustrates an example of a docking station having a well for docking a stylus barcode reader.
Figure 12:
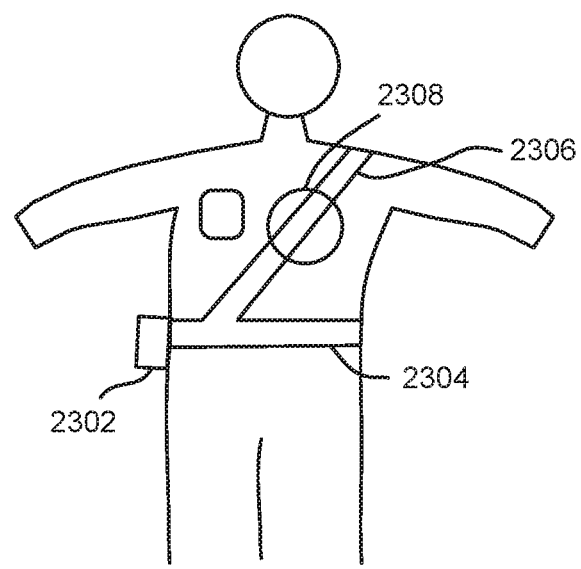
FIG. 12 illustrates, as an example, a docking station secured to an individual using a belt.

FIG. 10 illustrates yet another exemplary docking station 2100 in accordance with the present disclosure. The docking station 2100 is configured as a wearable docking station sized to fit within a typical chest pocket of a shirt, or to be mounted in zone 2308 of a shoulder belt 2306 or zone 2302 of a waste belt 2304, both as depicted in FIG. 12.

The docking station 2100 may include a body 2113 which includes a battery 2300 and a partially open barrel-shaped docking mount 2114 to hold a stylus barcode reader 1100 on one of the sides of the case (shown from the front side, facing away from the user when worn in a chest pocket). The docking mount 2114 functions as a docking station for the stylus barcode reader 1100 and may include some or all of the features of the docking station 1300 disclosed above.

In more detail, the docking mount 2114 may include at least two charging contacts 2112 including at least one for power and at least one for ground. The charging contacts 2112 of the docking mount 2114 are coupled to charging contacts 1112 on the stylus barcode reader 1100 when the stylus barcode reader 1100 is positioned against a mating surface 2111 of the docking mount 2114 in a similar manner as described with respect to the docking station 1300 of FIG. 4.

Similar to the docking station 1300 of FIG. 4, the docking mount 2114 may include a positioning structure for generally guiding alignment of the stylus barcode reader 1100 towards the mating surface 2111 of the docking mount 2114 and, more specifically, generally guiding alignment of the stylus barcode reader 1100 towards the mating surface 2111 to a point where the magnetic fields (described herein) are able to take effect and provide precise alignment of the stylus barcode reader 1100 with the mating surface 2111 in a manner in which the charging contacts 1112 of the stylus barcode reader 1100 align with, and are in contact with, the charging contacts 2112 of the docking mount 2114.

The positioning structure is similar to that described with respect to docking station 1300 and may include the sides 2118a, 2118b of the partially open barrel-shaped structure which guides the barcode reader 1100 into general alignment between the charging contacts 1112 of the barcode reader 1100 and the charging contacts 2112 of the docking mount 2114.

Further, for general longitudinal and rotational alignment, the positioning structure may further include a ridge 2120 extended outward from the mating surface 2111 and may be configured to engage with a cavity or a recess 1125 formed in a housing 1102 of the stylus barcode reader 1100. The ridge 2120 may be smaller than the cavity or recess 1125 to provide general alignment. Alternatively, the positioning structure may be a cavity extending into the mating surface 2111 of the docking mount 2114, and a corresponding ridge may be formed in the housing 1102 of the stylus barcode reader 1100.

The docking mount 2114 may include a magnetic structure 2116 similar to that described with respect to the docking station 1300 of FIG. 4 for holding the stylus barcode reader 1100 against the mating surface 2111. The magnetic structure 2116 may include one or more magnets. For example, the magnetic structure 2116 may include a first magnet 2116a with a north polarity directed towards the stylus barcode reader 1100 when the stylus barcode reader 1100 is positioned against the mating surface 2111, and a second magnet 2116b with a south polarity directed towards the stylus barcode reader 1100 when the stylus barcode reader 1100 is positioned against the mating surface 2111. The magnetic structure 2116 and the magnetic structure 1116 in the stylus barcode reader 1100 result in the stylus barcode reader 1100 i) being attracted to and positioned against the mating surface 2111 when a magnetic field of the first magnet of the stylus barcode reader 1100 is attracted to a magnetic field of the first magnet of the docking mount 2114 and a magnetic field of the second magnet of the stylus barcode reader 1100 is attracted to a magnetic field of the second magnet of the docking mount 2114, and ii) being repelled from being positioned against the mating surface 2111 when the magnetic field of the first magnet of the stylus barcode reader 1100 is repelled from the magnetic field of the second magnet of the docking mount 2114 and the magnetic field of the second magnet of the stylus barcode reader 1100 is repelled from the magnetic field of the first magnet of the docking mount 2114.

Figure 13:
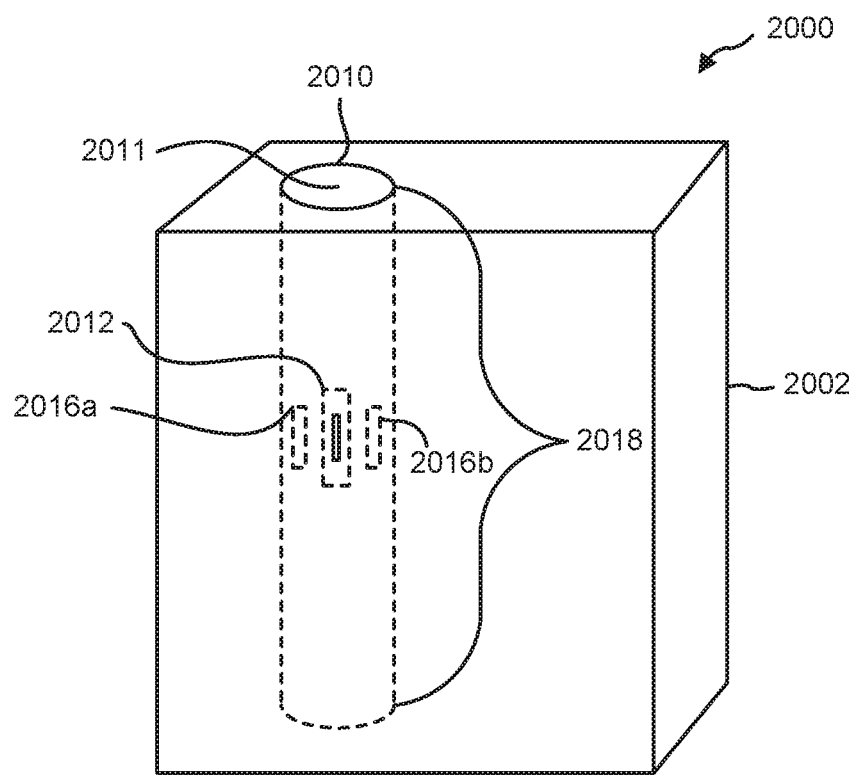
FIG. 13 shows an example of a case for a hand-held computing device with a well for charging a stylus barcode reader.

FIG. 13 depicts yet another embodiment of a docking station 2000 in accordance with the present disclosure. Like docking station 2100 of FIG. 10, docking station 2000 is configured as a wearable docking station sized to fit within a typical chest pocket of a shirt, or to be mounted in zone 2308 of the shoulder belt 2306 or zone 2302 of the waste belt 2304, both as depicted in FIG. 12.

The docking station 2000 includes a docking well 2010 which may be formed in the body 2002 of the docking station 2000. The stylus barcode reader 1100 may be inserted into the well 2010. The well 2010 includes charging contacts 2012 for charging the stylus barcode reader 1100 when the stylus barcode reader 1100 is inserted into the well 2010.

The well 2010 includes a cavity 2011 and a plurality of charging contacts 2012 on the interior periphery of the cavity 2011. A stylus barcode reader 1100 is inserted into the cavity 2011 for charging. The charging contacts 2012 include at least one contact for power and at least one contact for ground. The charging contacts 2012 are configured for coupling to charging contacts 1112 on the stylus barcode reader 1100 when the stylus barcode reader 1100 is positioned in the cavity 2011 at a correct depth and with a correct rotation.

The well 2010 and the stylus barcode reader 1100 may include positioning structure for generally guiding alignment of the stylus barcode reader 1100 towards the well 2010 of the docking station 2000, more specifically, guiding generally alignment of the charging contacts 1112 of the stylus barcode reader 1100 towards the charging contacts 2012 of the well 2010 to a point where the magnetic fields (described herein) are able to take effect and provide precise alignment of the stylus barcode reader 1100 within the well 2010 such that the charging contacts 1112 of the stylus barcode reader 1100 align with, and are in contact with, the charging contacts 2012 of the well 2010.

The positioning structure may be: i) the sides of the perimeter of the cavity 2011 (with a cross section larger than the diameter of the first portion 1102a of the barcode reader 1100) and the depth 2018 of the cavity 2011; and the external housing of the barcode reader 1100 as well as the distance between the capacitive tip 1104 and the charging contacts 1112. In combination, the positioning structure guides the barcode reader 1100 into general alignment into the cavity 2011 to a depth at which the capacitive tip 1104 touches the bottom of the cavity and at which point the charging contacts 1112 of the barcode reader 1100 are aligned (in the depth dimension) with the charging contacts 2012 on the well 2010 of the docking station 2000.

The well 2010 may further include a magnetic structure 2016 for rotating into rotational position, and holding the stylus barcode reader 1100 at a position within the cavity 2011 such that the charging contacts 1112 on the stylus barcode reader 1100 are in contact with the charging contacts 2012. The magnetic structure 2016 may include one or more magnets. For example, the magnetic structure 2016 may include a first magnet 2016a with a north polarity directed towards the stylus barcode reader 1100 when the stylus barcode reader 1100 is positioned within the cavity 2011, and a second magnet 2016b with a south polarity directed towards the stylus barcode reader 1100 when the stylus barcode reader 1100 is positioned within the cavity 2011. Corresponding magnets within the stylus barcode reader 1100, including a first magnet with a south polarity and a second magnet with a north polarity, may result in the stylus barcode reader 1100 i) being attracted to and positioned within the cavity 2011 with the charging contacts 1112 on the stylus barcode reader 1100 in contact with the charging contacts 2012 when a magnetic field of the first magnet of the stylus barcode reader 1100 is attracted to a magnetic field of the first magnet of the well 2010 and a magnetic field of the second magnet of the stylus barcode reader 1100 is attracted to a magnetic field of the second magnet of the well 2010, and ii) being repelled from being positioned within the cavity 2011 with the charging contacts 1112 on the stylus barcode reader 1100 in contact with the charging contacts 2012 when the magnetic field of the first magnet of the stylus barcode reader 1100 is repelled from the magnetic field of the second magnet of the well 2010 and the magnetic field of the second magnet of the stylus barcode reader 1100 is repelled from the magnetic field of the first magnet of the well 2010. As such, the attraction/repulsion forces will rotate the stylus into alignment and provide the sharp snap as the magnets make contact.

In other embodiments, the positioning structure may be a structure extending outward from a surface defining an entrance to the cavity 2011. The structure may be configured to engage with a corresponding positioning structure of the stylus barcode reader 1100.

Alternatively, the positioning structure may be a recess extending inward from a surface defining an entrance to the cavity 2011. The recess may be configured to engage with a corresponding positioning structure of the stylus barcode reader 1100.

The positioning structure may further be configured to rotate the stylus barcode reader 1100 within the cavity 2011 when the stylus barcode reader 1100 is inserted into the cavity 2011 such that the charging contacts 1112 on the stylus barcode reader 1100 are generally aligned with the charging contacts 2012.

The docking stations 1600, 2000 may be secured to an individual using an attachment feature. The attachment feature may be a waist belt, a shoulder belt, a flexible band, or a flexible strap. Alternatively, the attachment feature may be one of a clip, a safety pin and clasp combination, a flange for being sewn into an article of clothing, or any other means.

Figure 7:
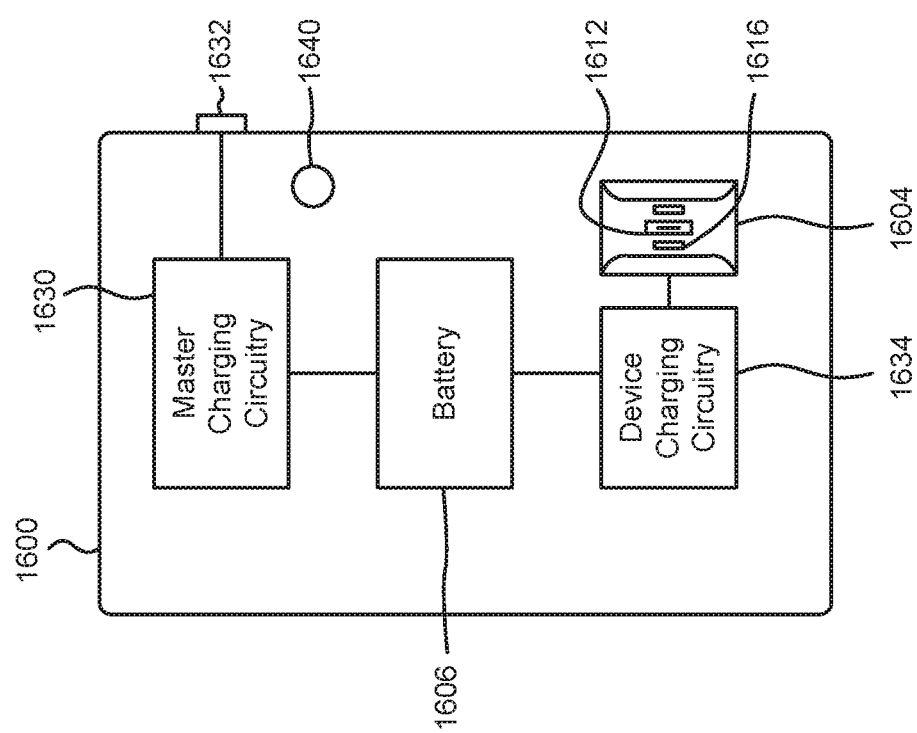
FIG. 7 shows a diagram of a case for a hand-held computing device in accordance with one embodiment.
Figure 14:
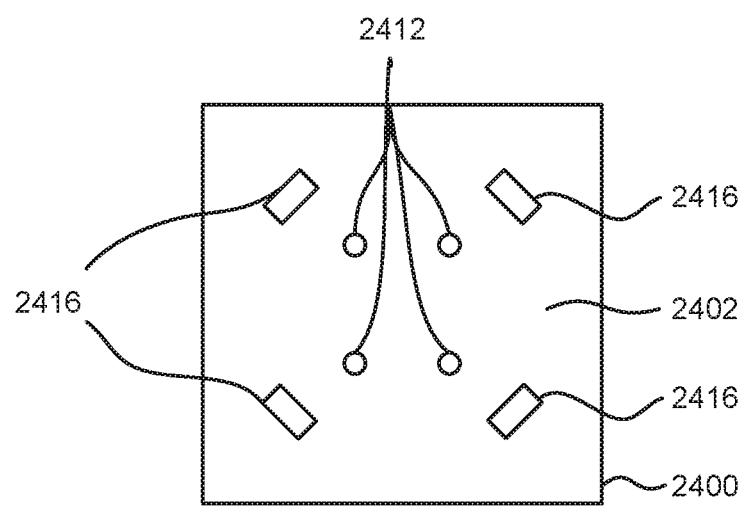
FIG. 14 illustrates an example of a flat docking station.

Referring to FIG. 7, the docking station 1600 (i.e., a case) and each of the wearable docking stations 2000, 2100, and 2400 (as shown in FIG. 14) may include structure depicted in FIG. 7. FIG. 7 depicts the structure embodied in the docking station 1600 for illustration purposes and the structure will be explained hereafter with reference to the docking station 1600. However, it should be noted that the docking stations 2000, 2100 and 2400 may also have a similar structure as depicted in FIG. 7. The docking station 1600 may include a master battery 1606 (also represented as 2300 in FIG. 10), master charging contacts 1632, a master charging circuitry 1630, and a device charging circuitry 1634.

The master charging contacts 1632 may include at least one master charging contact for power and at least one master charging contact for ground.

The master charging circuitry 1630 is coupled between the master battery 1606 and the master charging contacts 1632 and is configured to charge the master battery 1606 when the master charging contacts 1632 are coupled to an external power source (e.g., AC power through a wall outlet or a docking station for the case).

The master battery 1606 included in the docking station 1600 may: i) supply power to the other systems of the docking station as described in more detail in FIGS. 20A, 20B, 21A and 21B; and/or ii) supply power to the stylus barcode reader 1100 when docked to the docking station 1600. The master battery 1606 may be rechargeable and may be detachable and replaceable as shown in FIG. 9.

The device charging circuitry 1634 is coupled between the master battery 1606 and the charging contacts 1612 in the docking mount 1604 and may provide charging power from the master battery 1606 to the stylus barcode reader 1100 when the stylus barcode reader 1100 is docked in the docking mount 1604 (i.e., when the charging contacts 1612 are coupled to corresponding charging contacts 1112 on the stylus barcode reader 1100).

The case 1600 may further include a trigger button 1640 on the body 1602 to trigger scanning of a barcode when the stylus barcode reader 1100 is docked in the docking mount 1604.

Figure 15A:
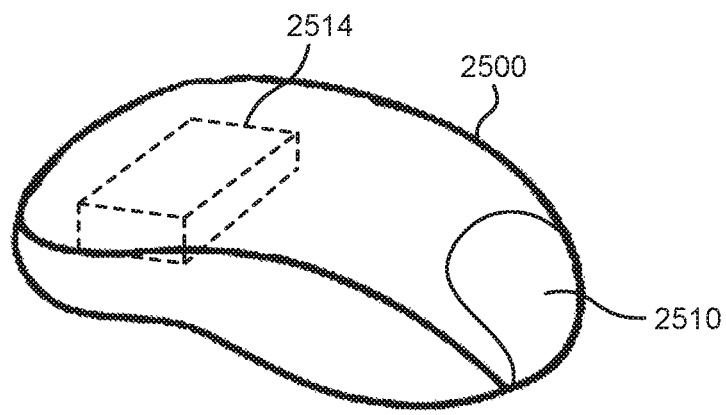
FIG. 15A illustrates an example of a mouse-shaped barcode reader with charging contacts on a bottom surface.
Figure 15B:
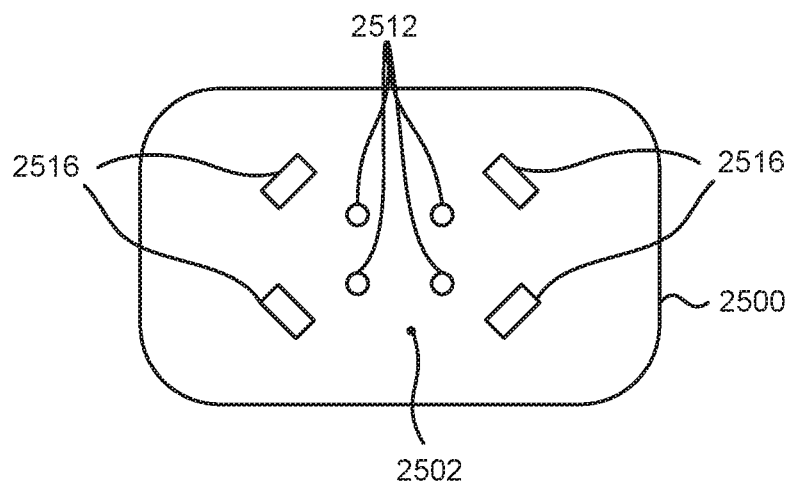
FIG. 15B illustrates a bottom view of the mouse-shaped barcode reader.

FIGS. 15A and 15B illustrate a perspective view and a bottom view of yet another exemplary barcode reader 2500 in accordance with the present disclosure. The barcode reader 2500 is a mouse-shaped barcode reader with charging contacts on a bottom surface (as illustrated in FIG. 15B). FIG. 14 illustrates yet another example of a docking station 2400 in accordance with an embodiment of the present disclosure that may be used with the mouse-shaped barcode reader 2500.

Figure 15C:
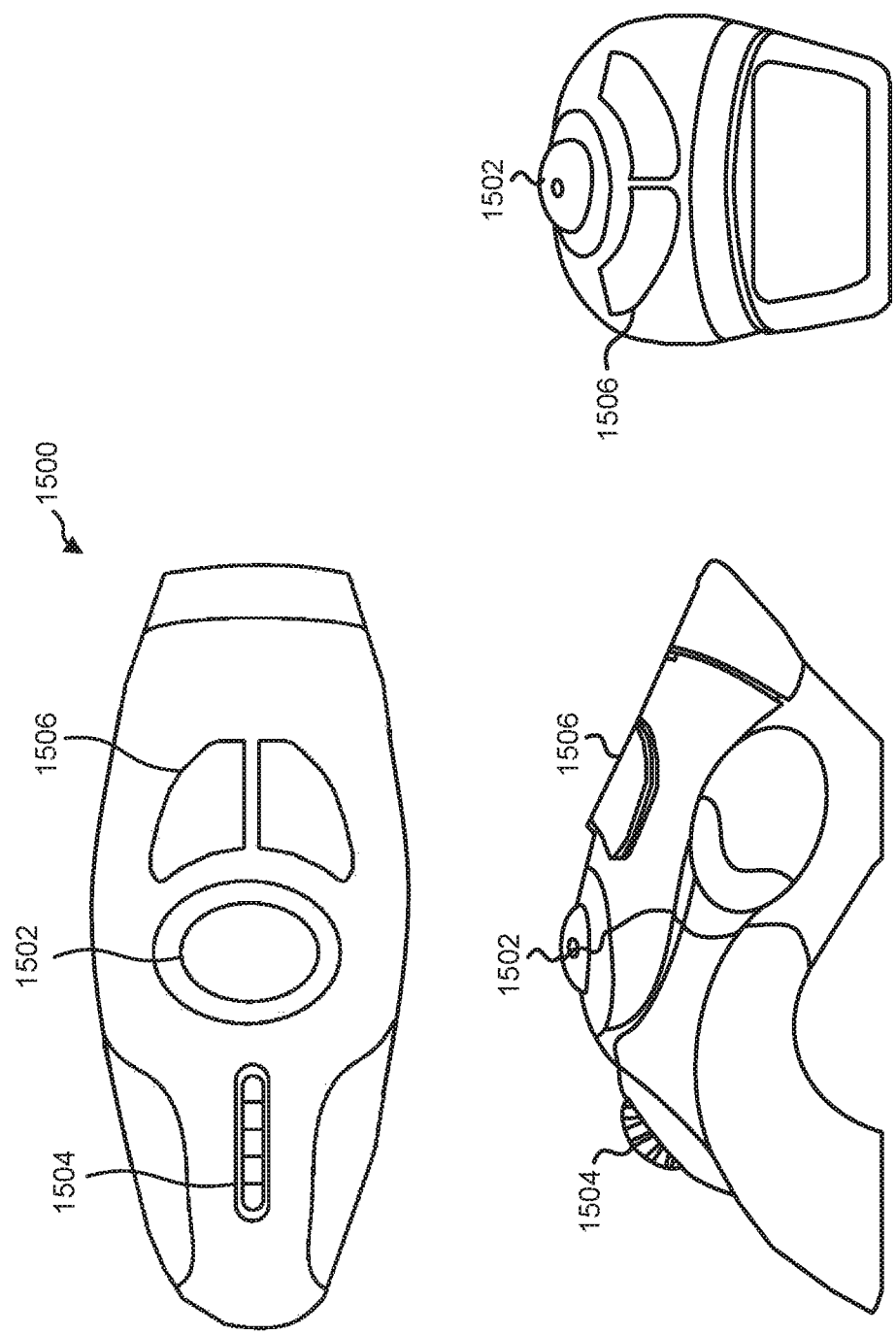
FIG. 15C illustrates top, side, and front views of an exemplary combined mouse barcode reader.

FIG. 15C illustrates top, side, and front views of an exemplary combined mouse barcode reader 1500. The combined mouse barcode reader 1500 may include a track ball 1502 and/or a roller wheel 1504 for scrolling a screen and moving a cursor as in a conventional computer mouse. The combined mouse barcode reader 1500 may have one or more push buttons 1506 (e.g., two push buttons). The push button(s) 1506 may be used to trigger capturing a barcode presented in a field of view of the camera included in the mouse barcode reader 1500. The combined mouse barcode reader 1500 may function as a handheld barcode reader and may be used on a flat surface like a traditional computer mouse. The combined mouse barcode reader 1500 may function both as a hand-held barcode reader and as a computer mouse.

The docking station 2400 shown in FIG. 14 is a wearable flat docking station 2400 which again may be configured as a wearable docking station sized to fit within a typical chest pocket of a shirt, or to be mounted in zone 2308 of shoulder belt 2306 or zone 2302 of a waste belt 2304, both as depicted in FIG. 12.

The docking station 2400 includes a mating surface 2402 and charging contacts 2412. The mating surface 2402 is a surface against which a barcode reader 2500 (shown in FIG. 15A) is positioned for charging. The charging contacts 2412 include at least one charging contact for power and at least one charging contact for ground. The charging contacts 2412 are coupled to charging contacts 2512 on the barcode reader 2500 when the barcode reader 2500 is positioned against the mating surface 2402.

The docking station 2400 and barcode reader 2500 may include a positioning structure. The positioning structure of the barcode reader 2500 may include a cavity cross section at a base end of the positioning structure adjacent to the mating surface 2111 which is larger than a cross section at a distal end of the positioning structure spaced away from the mating surface 2111 (into the interior of the barcode reader 2500) such that when the barcode reader 2500 is imprecisely aligned with the distal end with protrusions on the docking station 2400, the positioning structure may guide the barcode reader 2500 into precise alignment against the mating surface (e.g., the surface 2402) of the docking station (e.g., the docking station 2400).

The docking station 2400 may include a magnetic structure 2416 (e.g., magnets) for holding the barcode reader 2500 against the mating surface 2402. For example, the magnetic structure 2416 may include a first magnet with a north polarity directed towards the barcode reader 2500 when the barcode reader 2500 is positioned against the mating surface 2402, and a second magnet with a south polarity directed towards the barcode reader 2500 when the barcode reader 2500 is positioned against the mating surface 2402. Corresponding magnets within the barcode reader 2500, including a first magnet with a south polarity and a second magnet with a north polarity, may result in the barcode reader 2500 i) being attracted to and positioned against the mating surface 2402 of the docking station 2400 when a magnetic field of the first magnet of the barcode reader 2500 is attracted to a magnetic field of the first magnet of the docking station 2400 and a magnetic field of the second magnet of the barcode reader 2500 is attracted to a magnetic field of the second magnet of the docking station 2400, and ii) being repelled from being positioned against the mating surface 2402 of the docking station 2400 when the magnetic field of the first magnet of the barcode reader 2500 is repelled from the magnetic field of the second magnet of the docking station 2400 and the magnetic field of the second magnet of the barcode reader 2500 is repelled from the magnetic field of the first magnet of the docking station 2400.

The docking station 2400 may include a positioning structure for aligning the barcode reader 2500 against the mating surface 2402 when the barcode reader 2500 is positioned against the mating surface 2402. For example, the positioning structure may be configured to rotate the barcode reader 2500 into alignment against the mating surface 2402 when the barcode reader 2500 is attracted to the mating surface 2402 by the magnetic field of the first magnet of the barcode reader 2500 being attracted to the magnetic field of the first magnet of the docking station 2400 and the magnetic field of the second magnet of the barcode reader 2500 being attracted to the magnetic field of the second magnet of the docking station 2400.

The positioning structure may be configured to laterally displace the barcode reader 2500 into alignment against the mating surface 2402 when the barcode reader 2500 is attracted to the mating surface 2402 by the magnetic field of the first magnet of the barcode reader 2500 being attracted to the magnetic field of the first magnet of the docking station 2400 and the magnetic field of the second magnet of the barcode reader 2500 being attracted to the magnetic field of the second magnet of the docking station 2400.

The positioning structure may be a structure (e.g., a ridge) extending outward from the mating surface 2402 and configured to engage with an external housing of the barcode reader 2500. The positioning structure may extend outward from the mating surface 2402 to engage with a cavity or a recess formed in a housing of the barcode reader 2500.

Alternatively, the positioning structure may be a cavity extending into a housing of the docking station 2400 from the mating surface 2402 to engage with an external housing of the barcode reader 2500.

The docking station 2400 may include a battery (not shown) for charging the barcode reader 2500 docked in the docking station 2400. The docking station 2400 may include master charging contacts, a master charging circuit, and a device charging circuit, similar to the configuration shown in FIG. 7. The master charging contacts include at least one master charging contact for power and at least one master charging contact for ground. The master charging circuitry is coupled between the battery and the master charging contacts and configured to charge the battery when the master charging contacts are coupled to an external power source. The device charging circuitry is coupled between the battery and the charging contacts and configured to provide charging power from the battery to the barcode reader 2500 when the charging contacts 2412 are coupled to the charging contacts 2512 on the barcode reader 2500.

The mouse-shaped barcode reader 2500 includes a barcode reading unit 2510, a battery 2514 and charging contacts 2512 on the bottom surface 2502. The mouse-shaped barcode reader 2500 with a flat bottom surface 2502 can be docked in a flat docking station 2400 shown in FIG. 14. It should be noted that the shape of the barcode reader 2500 is provided as an example and the barcode reader 2500 may be in any shape.

The barcode reading unit 2510 is for reading a barcode presented in a field of view of the barcode reading unit 2510. The battery 2514 supplies operating power for the barcode reading unit 2510. The barcode reader 2500 has a flat bottom surface 2502 (i.e., a mating surface) configured to position against a corresponding mating surface 2402 of a docking station 2400 when the barcode reader 2500 is positioned on the docking station 2400 for charging.

The charging contacts 2512 include at least one charging contact for power and at least one charging contact for ground. The charging contacts 2512 are coupled to charging contacts 2412 on the docking station 2400 when the barcode reader 2500 is positioned against the mating surface 2402 of the docking station 2400.

The barcode reader 2500 may include a magnetic structure 2516 (e.g., magnets) for holding the barcode reader 2500 against the mating surface 2402 of the docking station 2400. The barcode reader 2500 may include a positioning structure for aligning the barcode reader 2500 against the mating surface 2402 of the docking station 2400 when the barcode reader 2500 is positioned against the mating surface 2402 of the docking station 2400. The magnetic structure and the positioning structure of the barcode reader 2500 are structures corresponding to the magnetic structure and the positioning structure of the docking station 2400. The positioning structure may be a periphery of a housing of the barcode reader 2500 to be engaged with an extension formed around an edge of the mating surface 2402 of the docking station 2400.

The barcode reader 2500 may include a radio frequency (RF) circuitry for sending image data or decoded data of a barcode to a remote host. The barcode reader 2500 may include a trigger button for triggering capturing of an image of a barcode. The barcode reader 2500 may include an indicator signal generator for generating a signal indicating a successful reading of a barcode. The barcode reader 2500 may be in a computer mouse shape, or in any other shape with a flat mating surface.

Figure 16:
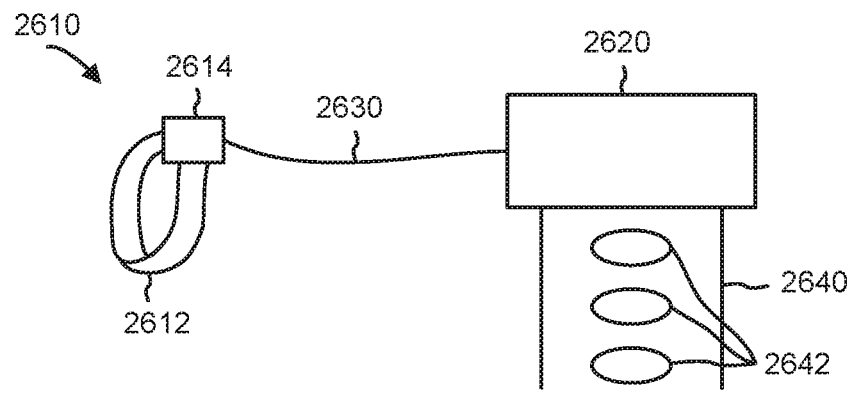
FIG. 16 illustrates a ring reader and a wrist watch connected by a wire in accordance with an exemplary embodiment.

FIG. 16 illustrates a ring reader and a wrist watch connected by a wire. The ring reader 2610 includes a ring-shaped body 2612 and a scan head 2614 included in the ring-shaped body 2612 for scanning a barcode in a field of view of the scan head 2614.

The wrist watch 2620 is in communication with the ring reader 2610 and configured to process data received from the ring reader 2610. The ring reader 2610 and the wrist watch 2620 may be connected via a wire connection 2630 for communicating data between the ring reader 2610 and the wrist watch 2620. Alternatively, a wireless connection may be established between the ring reader 2610 and the wrist watch 2620. The wrist watch 2620 may include a wireless interface for communicating with a host computer using a wireless protocol, such as IEEE 802.11 WiFi or Bluetooth.

The wrist watch 2620 includes a battery 2642 for providing operating power for the scan head 2614 through the wire connection 2630. The battery 2642 may be included in a band 2640 of the wrist watch 2620. The wire connection 2630 may be compatible with a Universal Serial Bus (USB) protocol.

Figure 17:
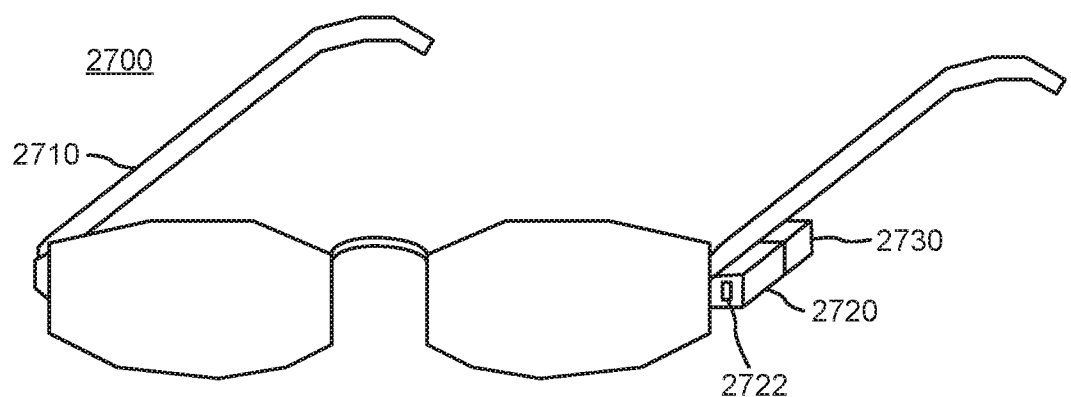
FIG. 17 illustrates an example of an eyeglass barcode reader.

FIG. 17 illustrates an example of an eyeglass barcode reader. The barcode reader 2700 includes an eyeglass frame 2710, a barcode reader 2720, and a battery 2730. The barcode reader 2720 includes a camera 2722 installed on the eyeglass frame for reading a barcode in a field of view of the camera 2722. The battery 2730 provides operating power for the barcode reader 2720. The barcode reader 2700 may include a pointing device for aiding a user to aim the camera at the barcode. The pointing device may be a laser. The barcode reader 2720 may be configured to read the barcode in response to a trigger signal. The barcode reader 2700 may include a power/data interface for sending data to a host computer and receiving power from a power source.

FIG. 18A through FIG. 20B are representations of yet another docking station 202 for a barcode reader 219 according to embodiments of the present disclosure. In this example the barcode reader 219 may be a mobile device 206 that is enclosed within a case 204 which both: i) protects the mobile device 206 from damage; and ii) provides a mating surface for positioning the barcode reader 219 within the docking station 202. The mobile device 204 may be a cellular phone, smart phone, tablet or other mobile device which includes a camera that may be used for capturing and an image of a barcode for decoding within a mobile app installed thereon.

Similar to the barcode reader 1100 depicted in FIG. 1, the barcode reading mobile device 204 may include an internal or built-in battery, capacitive power storage, or power source or storage (power storage 217). In some situations, the user may exhaust the internal power storage 217 before she is finished with her desired task.

Figure 18A:
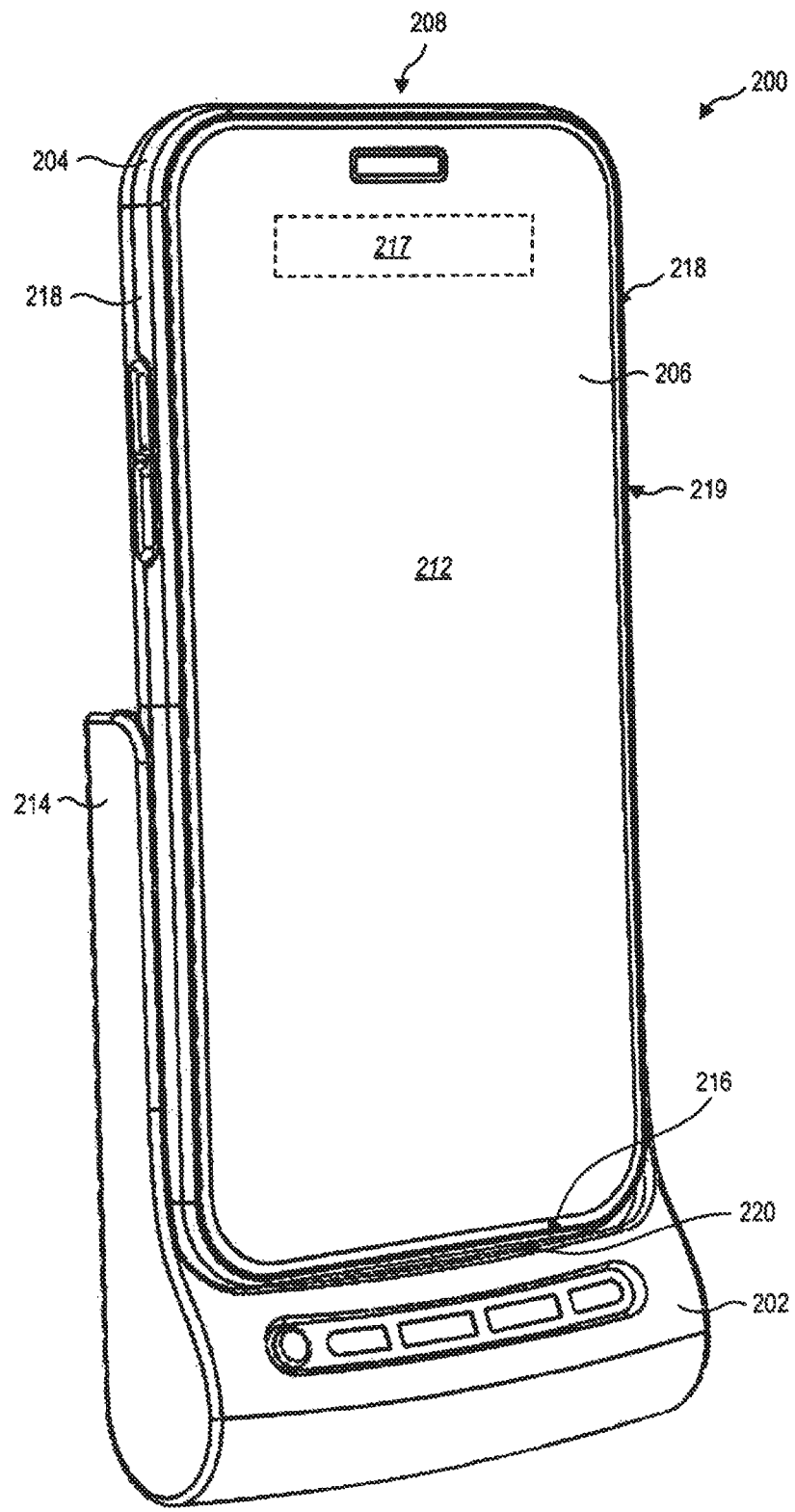
FIG. 18A is a perspective view of a front of an interim charging system, according to at least one embodiment of the present disclosure.

FIG. 18A is a front perspective view of the mobile device 206, case 2014 and docking station 202 (collectively system 200) according to at least one embodiment of the present disclosure.

In some embodiments, the mobile device 206 may be used in harsh environments. To protect the mobile device 206, the case 204 surrounds or at least partially encapsulates at least a portion of the mobile device 206. For example, the case 204 may surround an outer edge 208 of the mobile device 206. In other examples, the case 204 may surround the outer edge 208 and a back (see back 210, infra FIG. 18B) of the mobile device 206. In still other examples, the case 204 may surround an entirety of the mobile device 206, including the outer edge 208, the back, and the front 212. The case 204 may provide some protection to the mobile device 206. For example, the case 204 may provide protection from mechanical forces against the mobile device 206, thereby protecting the outer edge 208, the back, the front 212, and combinations thereof, from impact, compressive, tensile, torsional, and other mechanical forces. In other examples, the case 204 may provide some protection from chemical hazards for the mobile device 206, such as water damage to electronics in the mobile device 206, chemical reactions with components of the mobile device 206, acidic or basic etching, eroding, or dissolution of components of the mobile device 206, and other chemical hazards. In still other examples, the case 204 may provide protection from pathogens that may contact and remain in contact with the mobile device 206 after use. Such a case 204 may be washed or sterilized between uses. In yet other examples, the case 204 may provide mechanical, chemical, other protection, and combinations thereof for the mobile device 206. In this manner, the case 204 may protect the mobile device 206 during use in harsh environments, such as outdoor, industrial, factory, construction, warehouse, or other environments.

In some embodiments, the case 204 may at least partially encapsulate and/or conform to the form factor of the mobile device 206. In other words, the case 204 may have a similar shape as the mobile device 206, and/or may not materially increase the weight, length, width, thickness, feel, or other feature of the mobile device 206. This may improve the user experience by maintaining some or all of the aesthetics of the un-encased mobile device 206, improving the comfort of the user, reducing the strain of use for the user, and combinations of the foregoing.

In the embodiment shown in FIG. 18A, the case 204 and the mobile device 206 are in a connected configuration with the docking station 202. In other words, in the connected configuration, the case 204 and the mobile device 206 are docked to, mounted on, attached to, in contact with, retained against, or otherwise connected to the docking station 202. In this manner, the docking station 202 may be any device configured to retain the case 204, such as a dock, a mount, an attachment point, a connector, a retainer, a holster, and combinations thereof, for the case 204 and the mobile device 206. This may allow the case 204 to be easily accessible from a variety of locations for the user, including the user's body, a mobile structure (e.g., a cart, a bicycle), a shelf, a chair, and so forth.

In the connected configuration, the case 204 is in physical contact with the docking station 202. The case 204 and the docking station 202 may include magnetic structure for aligning and holding the case 204 (with the encapsulated mobile device 206) to a mating surface of the docking station 202. More specifically, a magnetic attraction between the docking station 202 and the case 204 may magnetically align and hold the case 204 to the docking station 202.

The docking station 202 includes two side surfaces 214 (only one is visible in the embodiment shown) and a base surface 216 which form positioning structure for generally guiding alignment of the case 204 (with the encapsulated mobile device 206) towards a mating surface of the docking station 202 and, more specifically, generally guiding alignment of the case 204 towards the mating surface to a point where the magnetic fields (described herein) are able to take effect and provide precise alignment of the case 204 with the mating surface of the docking station 202 with a sharp snap, thereby aligning charging structure of the docking station 202 with charging structure of the barcode reader 219 (e.g. with charging structure of case 204 or charging structure of the encapsulated mobile device 206).

In more detail, the two side surfaces 214 may guide and at least partially secure (e.g., in addition to the magnetic connection) the case 204 to the docking station 202 by contacting one or both of the two case sides 218, thereby securing the case 202 against lateral and/or rotational movement. Furthermore, the base surface 216 may at least partially secure the case 204 to the docking station 202 by contacting the case base 220, thereby securing the case 202 against longitudinal and/or rotational movement. In this manner, the docking station 202 may at least partially secure, retain, or otherwise prevent disconnection of the case 204 relative to the docking station 202.

Figure 18B:
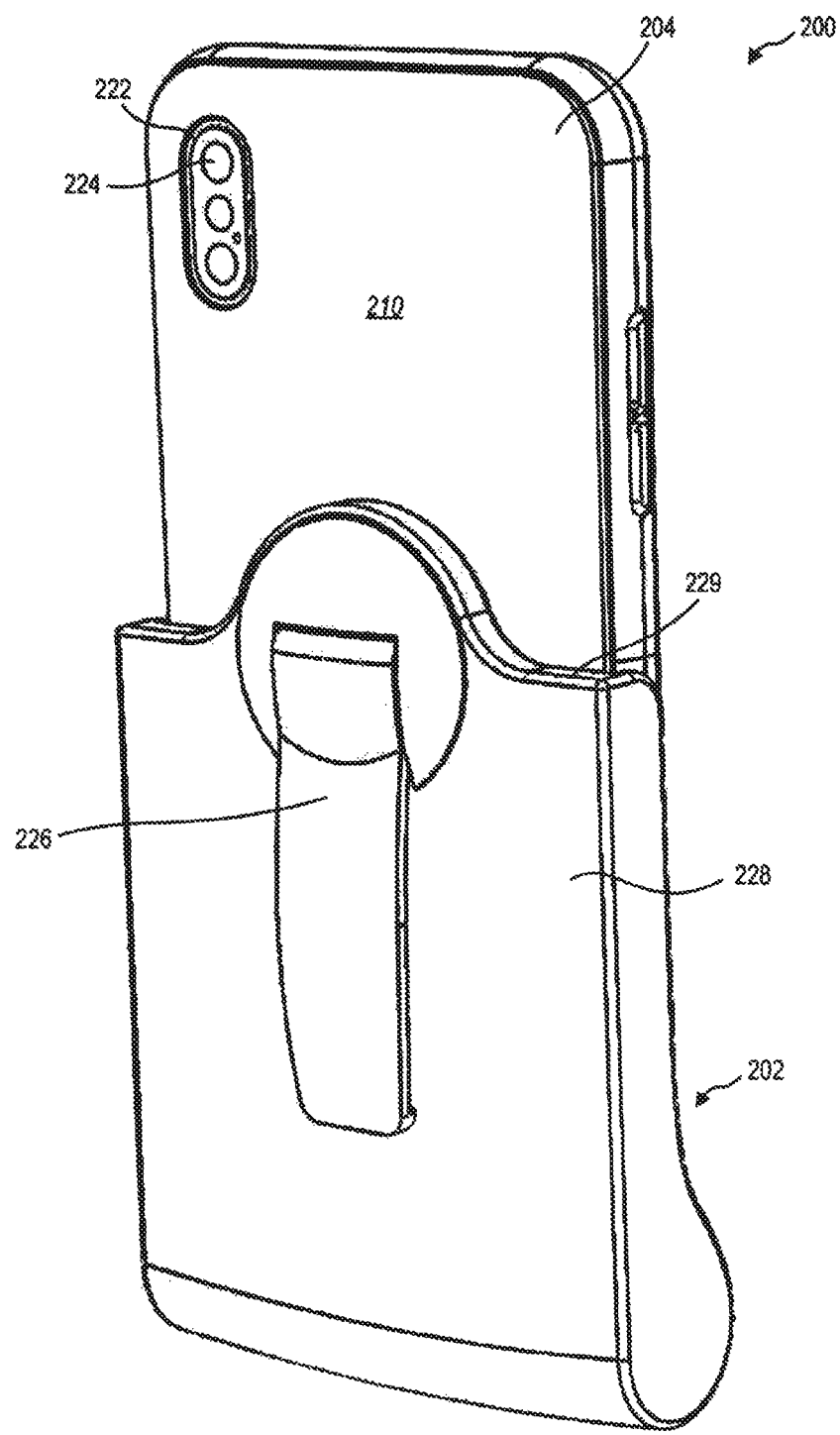
FIG. 18B is a perspective view of a back of the interim charging system of FIG. 18A, according to at least one embodiment of the present disclosure.

FIG. 18B is a rear perspective view of the system 200 of FIG. 18A. In the embodiment shown, the back 210 of the case 204 includes an aperture 222 for the field of view of a camera 224 extending from the back of the mobile device (e.g., mobile device 206 of FIG. 18A). In this manner, the mobile device may use the camera 224 while enclosed within the case 204. In some embodiments, the case 204 may cover the camera 224 with a clear covering so that the camera 224 is mechanically and/or chemically protected during operation.

A back surface 228 of the docking station 202 extends up the back 210 of the case 204. In some embodiments, the back surface 228 extends up 50% of the back 210 of the case 204. In other embodiments, the back surface 228 extends up 75% of the back 210 of the case 204. In yet other embodiments, the back surface 228 extends up 100% of the back 210 of the case 204. In at least one embodiment, a back surface 228 that extends higher up the back 210 of the case 204 may secure the case 204 to the docking station 202 more securely. However, a back surface 228 that extends lower up the back 210 may reduce the profile of the docking station 202, thereby decreasing the weight and/or increasing the comfort of use for the user. In some embodiments, the back surface 228 may be open at a top end 229 of the back surface 228. An open top end 229 may allow the case 204 to be easily accessed by the user, thereby improving the user experience.

The docking station 202 includes an attachment mechanism 226 on the back surface 228. The attachment mechanism 226 may be configured to attach to any location. For example, in the embodiment shown, the attachment mechanism 226 is a clip configured to attach to an article of clothing. For example, the attachment mechanism may be a clip configured to attach to zone 2308 of a shoulder belt 2306 or zone 2302 of a waste belt 2304, both as depicted in FIG. 12. In other examples, the attachment mechanism 226 may be a clip configured to attach to an arm band, leg band, hip pocket, rear pocket, chest pocket, or other portion of a user's clothing or accessories. In some embodiments, the attachment mechanism 226 may be a band configured to connect the docking station 202 to a user. In yet other examples, the attachment mechanism 226 may be configured to connect to a mobile cart, shelf, bicycle, scooter, automobile, or other mobile structure or vehicle. In the same or other embodiments, the attachment mechanism 226 may include one or more magnets, clips, straps, zip-ties, Velcro connections, mechanical fasteners (e.g., screws, bolts), or another type of attachment mechanism 226. In at least one embodiment it may be critical that the attachment mechanism 226 attaches to a user to improve accessibility of the device for the user.

By securing the case 204 to the docking station 202, which may be connected to a person or mobile structure, the mobile device 206 may be secured to the person or mobile structure. This may provide a secure or safe location to place the mobile device 206 while performing a task or while moving. This may help to prevent damage and/or loss of the mobile device 206 while the user is performing a task.

Figure 19A:
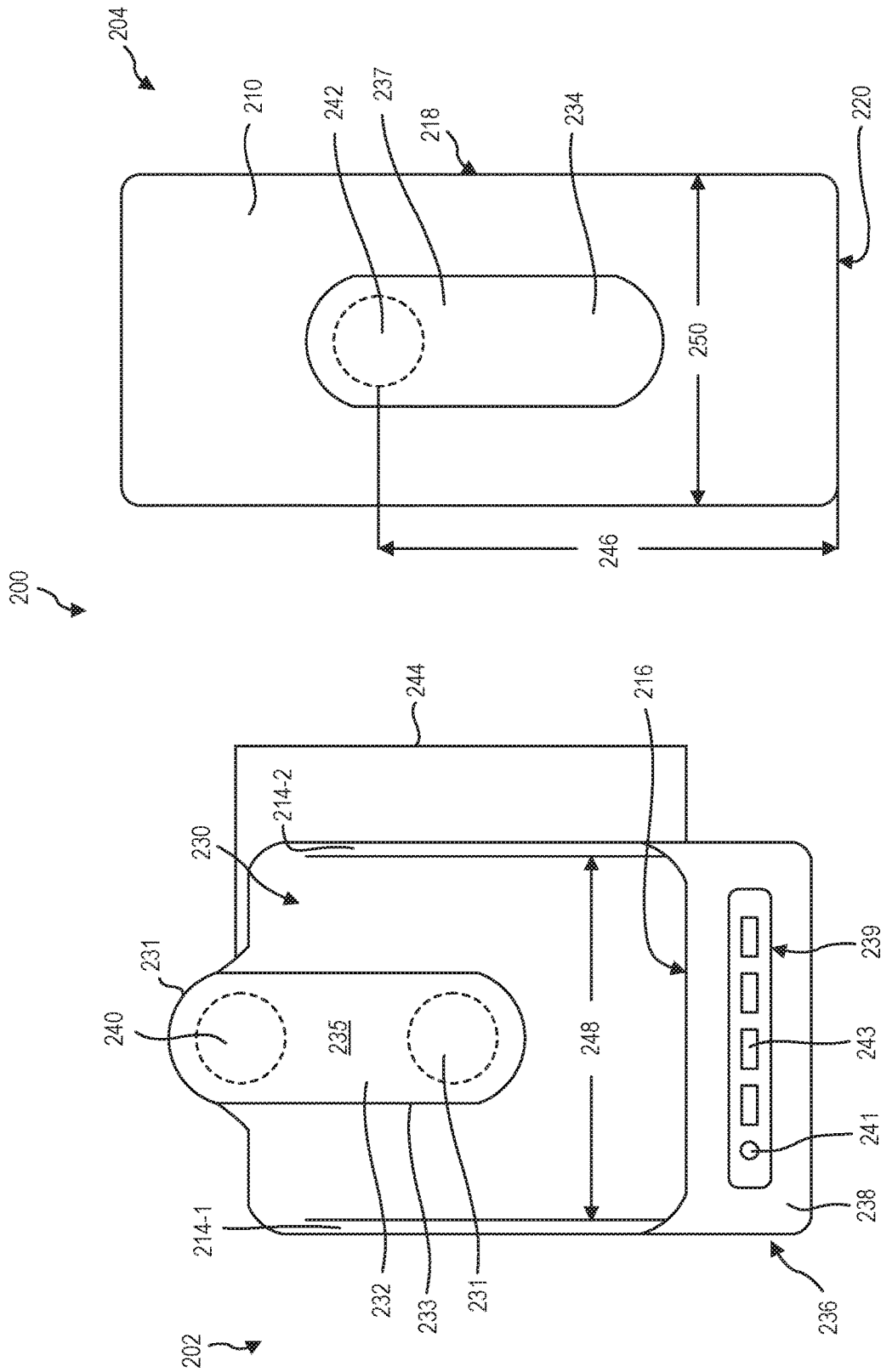
FIG. 19A is a plan view of an interim charging system in an unconnected configuration, according to at least one embodiment of the present disclosure.

FIG. 19A is a plan view of the docking station 202 and the case 204 in an unconnected configuration, according to at least one embodiment of the present disclosure. The docking station 202 includes a mating surface 230 which extends between, and is generally perpendicular to the side the two side surfaces 214 (e.g. first side surface 214-1 which extends transverse to the mating surface 230 and second side surface 214-2 which is located opposite the first side surface 214-1 across the mating surface 230 and extends transverse to the mating surface 230). The base surface 216 is located between the first side surface 214-1 and the second side surface 214-2 and extends transverse to the mating surface 230. In some embodiments, one or more of the first side surface 214-1, the second side surface 214-2, and the base surface 216 extend perpendicular from the mating surface 230.

The docking station 202 may include a means for magnetically aligning and securing the barcode reader 219 (e.g. the mobile device 206 encapsulated within the case 204) to the mating surface 230. In the embodiment shown, the docking station 202 includes a magnet 231 located on the mating surface 230. The case 204 includes a magnetic portion 234 on the back 210 of the case 204.

Figure 19B:
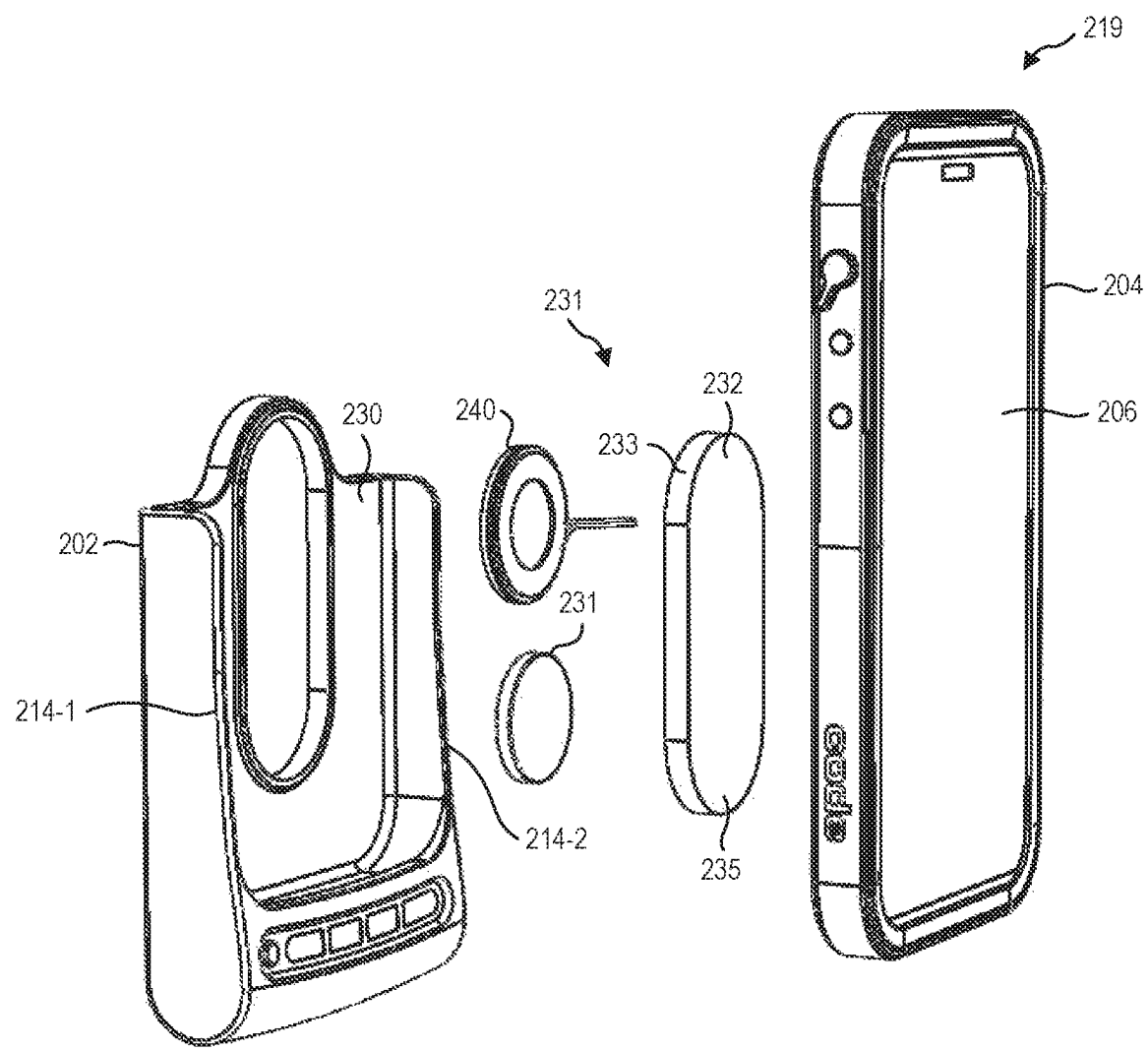
FIG. 19B is an exploded view of the interim charging system of FIG. 19A, according to at least one embodiment of the present disclosure.
Figure 19C:
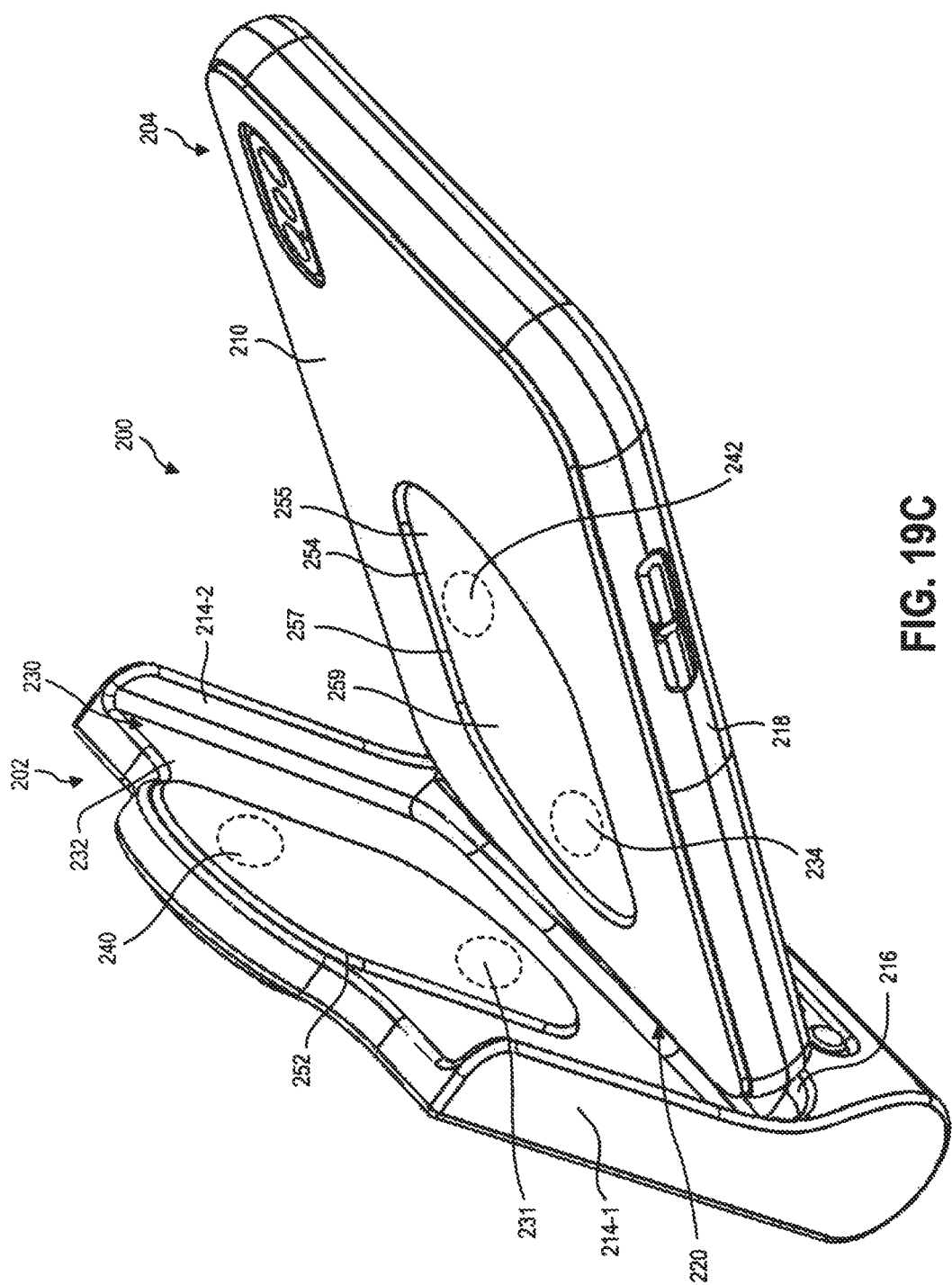
FIG. 19C is a perspective view of the interim charging system of FIG. 19A, according to at least one embodiment of the present disclosure.

In more detail, referring to FIG. 19B and FIG. 19C, the docking station 202 may include docking station alignment feature 231 which may include a protruded portion 232 of the mating surface 230. The protruded portion 232 may include periphery sides 233 generally perpendicular to the mating surface 230, and extending from the mating surface 230, and a protruded surface 235 generally parallel to the mating surface 230. The magnet 231 is within the protruded portion 232 behind the protruded surface 235.

The protruded portion 232 is positioned and sized to align with and fit within a case alignment feature 254. The case alignment feature 254 includes a recessed portion 255 (recessed within the back surface 210 of the case 204). The recessed portion 255 may include periphery sides 247 generally perpendicular to the back surface 210, extending into the back surface 210, and including a recessed surface 259 generally parallel to the back surface 210. The magnetic portion 234 is within the recessed portion 255 positioned to align with the magnet 231 when the barcode reader 219 is positioned within the docking station 202 such that the protruded portion 232 is inserted into the recessed portion 255.

When the barcode reader 219 (e.g. the mobile device 206 encapsulated within the case 204), is inserted into the docking station 202, the first side surface 214-1, the second surface 214-2 and the mating surface 230 serve to generally align the case 204 within the docking station 202 to a point where the magnetic attraction between the magnet 231 located within the protruded portion 232 and the magnetic portion 234 within the recessed portion 252 further displace the barcode reader 219 into precise alignment with the protruding portion 232 positioning within the recessed portion 252 with a sharp snap.

When the case 204 is in this connected configuration (as depicted in FIGS. 18A and 18B), the magnet 231 may be magnetically attracted to the magnetic portion 234. In this manner, the magnet 231 may magnetically secure the case 204 to the docking station 202 at the magnetic portion. A magnetic connection between the case 204 and the docking station 202 may be easy for the user to use because the case 204 may simply be pulled away from the docking station 202 with a removal force, without having to navigate a snap, clasp, or other mechanical retention mechanism. This may provide the user with a smooth transition from the connected configuration to the unconnected configuration, and from the unconnected configuration to the connected configuration.

Although the magnet 231 is depicted within the protruding portion 232, the magnet, or magnets, may be at one or more of the mating surface 230, the first side surface 214-1, the second side surface 214-2, and/or the base surface 216, or any other location of the mating surface 232.

In some embodiments, the docking station 202 may include a plurality of magnets 231. For example, the mating surface 230, the first side surface 214-1, the second side surface 214-2, and the base surface 216 may include a plurality of magnets. In the same or other examples, one or more of the mating surface 230, the first side surface 214-1, the second side surface 214-2, and the base surface 216 may include a plurality of magnets 231.

In some embodiments, the case 204 may include a plurality of magnetic portions 234. For example, a plurality of sections of the back 210 may be magnetic. In other examples, the case sides 218 may include one or more magnetic portions 234. In still other examples, the case base 220 may include one or more magnetic portions 234. In some embodiments, an entirety of the case 204 may be magnetic. In some embodiments, the magnetic portion 234 may include one or more magnets. In other embodiments, the magnetic portion 234 may include a magnetic material. In some embodiments, the docking station 202 may include a magnetic portion and the case 204 may include a magnet, such that the case 204 connects to the docking station with the magnet.

In some embodiments, the magnet 231 may be a permanent magnet. Similarly, the magnetic portion 234 may be a permanent magnet of polarity opposite the magnet 231. In this manner, the magnetic portion 234 and the magnet 231 may be magnetically attracted to each other, and the case 204 may be magnetically secured to the docking station 202. A magnetic portion 234 including a permanent magnet may increase the strength of the magnetic connection of the case 204 to the docking station 202. In other words, a magnetic portion 234 including a permanent magnet may magnetically secure the case 204 to the docking station 202 more strongly than a magnetic portion 234 made of a magnetic material. This may help to secure the case 204 to the docking station 202 when the interim charging system 200 is exposed to forces, vibrations, jostling, bumping, or other dislodging forces.

In combination with the magnetic connection between the magnet 231 and the magnetic portion 234, the mating surface 230 may help to secure the case 204 to the docking station 202. For example, the magnetic connection between the magnet 231 and the magnetic portion 234 may be multi-directional. In other words, the magnetic connection may not orient the case 204 relative to the docking station 202, or provide any magnetic resistance to rotation between the case 204 and the docking station. A mating surface 230 that is complementary to the case 204 may help to orient the case 204 and help to prevent rotational, longitudinal, and/or lateral movement of the case 204 relative to the docking station 202. This may increase the connection between the case 204 and the docking station 202, thereby reducing the chance of accidental disconnection of the case 204 from the docking station 202.

The mating surface 230 includes a first side surface 214-1 of the docking station 202 extends transverse to the back surface 232. A second side surface 214-2 is located opposite the first side surface 214-1 across the back surface 232 and extends transverse to the back surface 232. A base surface 216 is located between the first side surface 214-1 and the second side surface 214-2 and extends transverse to the back surface 232. In some embodiments, one or more of the first side surface 214-1, the second side surface 214-2, and the base surface 216 may extend perpendicularly to the back surface 232.

In some embodiments, the plurality of magnets 231 on the mating surface 230 may include one or more receiver alignment magnets. The receiver alignment magnets may include the same or the opposite polarity as the magnet 231. A plurality of case alignment magnets in the magnetic portion 234 of the case 204 may be configured to co-operate with the receiver alignment magnets to at least partially align the case 204 with the docking station 202. This alignment may be accomplished, for example, by coordinated placement of alignment magnets with opposing polarities that encourage the case 204 to align with the case receiving device. In some embodiments, the alignment magnets may align the case 204 with the docking station 202 rotationally, longitudinally, laterally, or combinations of the foregoing. The alignment magnets may help the user to consistently and easily secure the case 204 to the docking station 202 in connected configuration and orientation. Furthermore, the alignment magnets may help indicate to the user when the case 204 is out of alignment with the docking station 202.

In some embodiments, the magnet 231 may be located on the mating surface 230. In other words, the magnet 231 may be exposed on the mating surface 230, such that an outer surface of the magnet 231 is visible on and/or flush with the mating surface 230. In other embodiments, the magnet 231 may be embedded beneath the mating surface 230 such that the mating surface 230 covers the magnet 231. In still other embodiments, the magnet 231 may be located in a surface housing 235.

The surface housing 235 is located at the mating surface 230. In some embodiments, the surface housing 235 may be a protrusion of (e.g., may protrude or extend from) the mating surface 230. In other embodiments, the surface housing 235 may be a recess of (e.g., may be recessed into or indented in) the mating surface 230. In still other embodiments, the surface housing 235 may be located underneath the mating surface 230 such that the mating surface 230 is smooth across the surface housing 235. In some embodiments, the surface housing 235 may be installed on the mating surface 230 (e.g., over the magnet 231 and/or the charger 240), with an adhesive. In other embodiments, the surface 235 housing may be installed on the mating surface 230 with a mechanical connection, such as a press-fit connection, a screw, a bolt, a pin, or other mechanical connection. In yet other embodiments, the surface housing 235 may be connected to the mating surface 230 with a weld or any other connection.

In the connected configuration the docking station 202 may charge the battery within the mobile device 206. In other words, the docking station 202 may include a means for charging the mobile device 206.

In one embodiment, the docking station 202 may provide interim charging for the mobile device 206. Interim charging may provide charging for the mobile device 206 between connections of the mobile device 206 to a permanent power supply (e.g., a permanent docking station). This may improve the operating cycle of the mobile device 206, thereby improving the user's productivity and efficiency.

To provide for interim charging, the docking station 202 may include the structure described in FIG. 7, including a battery 1606. The battery may also be referred to as power storage and may be located inside of a power storage housing 236. In the embodiment shown, the power storage housing 236 may be located at a bottom end of the docking station 202. In other embodiments, the power storage housing 236 may be located on a back of the docking station 202 (e.g., behind the mating surface 230). In still other embodiments, the power storage housing 236 may be located anywhere on the docking station 202.

The power storage may be any mobile (e.g., not permanently connected to the general power grid) source of stored power. For example, the power storage 236 may be a rechargeable battery. In other examples, the power storage 236 may be a supercapacitor.

The docking station 202, like docking station 1600 may include master charging contacts 1632 and master charging circuitry 1630. The master charging contacts 1632 may include at least one master charging contact for power and at least one master charging contact for ground.

The master charging circuitry 1630 is coupled between the battery 1606 and the master charging contacts 1632 and is configured to charge the battery 1606 when the master charging contacts 1632 are coupled to an external power source (e.g., AC power through a wall outlet or a docking station for the case).

The docking station 202 may include device charging circuitry 1634 (alternatively referred to as a charger) coupled between the battery 1606 and the barcode reader 219 (e.g. coupled between the battery 1606 and either the case 204 or the mobile device 206) and provides power from the battery 1606 to the mobile device 206 when the mobile device 206 is secured to the docking station 202.

In one embodiment, the docking station 202 may include an inductive charging power coil 240 which may charge the mobile device 206 through an inductive charging receiving coil 242 within the barcode reader 219 (e.g. an inductive charging receiving coil within the case 204 or an inductive charging receiving coil within the mobile device 206. In this embodiment, the inductive charging power coil 240 may be part of the device charging circuitry 1634 and replace the charging contacts 1616.

In some embodiments, the charging circuitry 1634 may include a physical connection (e.g., plug), such as an APPLE LIGHTNING® connection, a micro-USB connection, a USB-C connection, a USB-B connection, a coaxial connection, other connection, or combinations of the foregoing. In some examples, the charging circuitry 1634 may include both a wireless charger and a physical connection.

In some embodiments, the case 204 may include a power coupling circuit. The power coupling circuit may couple power from the power storage 236 to the case 204.

The case 204 may further include a power contact and a ground contact. Power may be transferred to the mobile device 206 based on contact with the power contact and the ground contact with a device power receiving contact and a device ground connection contact. Thus, power may be transferred from the power storage 236 to the case 204 via inducting charging, and from the case 204 to the mobile device 206 via a physical contact with power and ground contact.

In some embodiments, the power storage 236 may directly transfer power to the mobile device 206. For example, the case 204 may at least partially encapsulate a mobile device 206 that includes a power receiver 242. The power receiver 242 may include a power coupling circuit that couples to charging contacts on the mobile device 206, such as charging contacts connected to the power storage 236. For example, in the embodiment shown, the power receiver 242 is an inductive charging receiving coil. When the case 204 is properly aligned in the connected configuration, the power receiver 242 and the charger 240 may be aligned such that the charger 240 may charge (e.g., transfer power to) the mobile device 206 through the power receiver 242. In this manner, the docking station 202 may be a portable or an interim charger. An interim charger may extend the work cycle of the mobile device 206, thereby improving user productivity. Furthermore, an induction charger may improve connection to the charger 240 by eliminating the need to precisely align and insert a plug into a port.

In some embodiments, the docking station 202 may include a sensor that indicates when the case 204 is properly installed and aligned in the connected configuration. For example, the sensor may include a switch on the mating surface 230 that is activated when the case 204 is connected to the docking station 202. The sensor may cause the charger 240 to be activated. In this manner, the docking station 202 may only provide power to the charger 240 when the case 204 is connected to the docking station 202, which may help to conserve the life of the power storage 236.

The case 204 includes a receiver opening 237. In some embodiments, the receiver opening may be a cut-out in the case 204 such that the back of the mobile device 206 is exposed through the receiver opening 237. In other embodiments, the receiver opening 237 may be a recess in the case 204. In yet other embodiments, the receiver opening 237 may be a protrusion in the case 204. In some embodiments, the magnetic portion 234 or at least part of the magnetic portion 234 is located in the receiver opening 237. The receiver opening 237 may be invisible or at least partially invisible to electromagnetic waves at the power receiver 242 to facilitate wireless charging of the mobile device 206.

As discussed above in relation to FIG. 18B, the docking station 202 includes an attachment mechanism 226 that may be attached to an article of clothing, the user, or a mobile structure. When the docking station 202 is attached to the article of clothing, the user, or the mobile structure, the docking station 202 may provide interim charging for a mobile device 206 when the user is working away from a main power supply (e.g., the power grid). This may extend the amount of time that the user may be away from the main power supply. Furthermore, by including the power storage 236 in the docking station 202, the case 204 may have a smaller form factor. This may make the case 204 lighter weight, easier for the user to hold, and improve the user experience. Because the docking station 202 may be located on an article of clothing, the user, or an article of clothing, the weight of the power storage 236 may reduce fatigue of the user's muscles (e.g., the user's arms) during use of the mobile device 206. Reducing user fatigue may improve the user's performance, reduce accidents, and reduce injury and other health-related issues.

The docking station 202 includes a status indicator 239. The status indicator may provide an indication of the status of the power storage 236. The status indicator 239 may include a charging indicator 241 that indicates when the power storage 236 is providing power to the charger 240. The status indicator 239 may further include a charge indicator 243 that indicates the percentage of charge remaining on the power storage 236. The status indicator 239 may help a user to assess the performance of the power storage 236 and determine for how much longer he or she may use the mobile device 206.

In the embodiment shown, the docking station 202 has a charger height 244, which is the distance from the base surface 216 to a center of the charger 240. The case 204 has a receiver height 246, which is the distance from the case base 220 to a center of the receiver 242. Because the charger 240 uses magnetic induction to charge the mobile device 206, the charger height 244 is the same as the receiver height 246 so that the induction field generated by the charger 240 is properly received and converted into electrical energy by the receiver 242. In some embodiments, the charger height 244 may be substantially the same as the receiver height 246, as long as the induction field generated by the charger can be converted into electrical energy by the receiver 242.

In some embodiments, the charger height 244 may be tailored to a specific mobile device. In other embodiments, the docking station 202 may include multiple chargers 240 that are located in a position configured to charge different mobile devices.

The mating surface 230 has a mating surface width 248 between the first side surface 214-1 and the second side surface 214-2. The case 204 has a case width 250 between the case sides 218. In some embodiments, the mating surface width 248 is the same as the case width 250. In this manner, the case 204 may be secured to the mating surface 230 with a snug or friction fit. In other embodiments, the mating surface width 248 may be larger than the case width 250 with a receiving tolerance, which is the difference between the mating surface width 248 and the case width 250.

FIG. 19C is a perspective view of the interim charging system 200 prior to being installed in the installed configuration, according to at least one embodiment of the present disclosure. In the embodiment shown, the case 204 is being connected to the docking station 202, by first bringing the case base 220 into contact with the base 216 of the docking station 202. However, it should be understood that the case 204 may be connected to the docking station 202 using any approach between the case 204 and the docking station 202. In the embodiment shown, the case 204 is not fully in the connected configuration shown in FIG. 18A and FIG. 18B.

The docking station 202 includes one or more retaining device alignment features 252. The case 204 includes one or more case alignment features 254. The retaining device alignment features 252 and the case alignment features 254 may cooperate to at least partially align the case 204 with the docking station 202. For example, the retaining alignment feature 252 may include a protrusion on the back surface 232 of the mating surface 230. The case 204 may include a complementary recess in the back 210 of the case 204. As the case 204 is moved into contact with the mating surface 230, the protrusion may completely or partially extend into the recess.

As the case 204 is secured to the mating surface 230, the protrusion may nudge or push the case 204 until the protrusion is inserted into the recess. For example, the magnet 231 may be attracted to the magnetic portion and pull the case 204 toward the docking station 202, and the protrusion may nudge the case 204 until the protrusion is completely inserted into the recess. In this manner, the magnetic attraction between the magnet 231 and the magnetic portion 234 may cooperate with the retaining device alignment features 252 and the case alignment features 254 to align the case 204 with the docking station 202.

In some embodiments, the retaining device alignment features 252 may include one or more of the first side surface 214-1, the second side surface 214-2, and the base surface 216. As the case 204 is moved toward the docking station 202, one or more of the first side surface 214-1, the second side surface 214-2, and the base surface 216 may contact the back 210, the case sides 218, or the case base 220. The first side surface 214-1, the second side surface 214-2, or the base surface 216 may help to guide or direct the case 204 into the proper alignment of the connected configuration. As discussed above, the magnetic attraction between the magnet 231 and the magnetic portion 234 may help the first side surface 214-1, the second side surface 214-2, or the base surface 216 to direct the case 204 into alignment with the docking station 202.

In some embodiments, the retaining device alignment features 252 may include a combination of the protrusion, the first side surface 214-1, the second side surface 214-2, the base surface 216, and other alignment features. Similarly, the case alignment features 254 may include a combination of the recess, the case back 210, the case sides 218, the case base 216, and other alignment features. A user may attempt to connect the case 204 with the docking station 202 without looking, or without fully paying attention to the alignment of the case 204 with the docking station 202. The complementary relationship between the retaining device alignment features 252 and the case alignment feature 254 may help the case 204 to be properly secured or mounted to the docking station 202 when the user does not look or pay fully attention to the connection. This may help to prevent the mobile device 206 from being dropped and damaged or lost. Furthermore, this may help to ensure that the charger 240 and the power receiver 242 are properly aligned to allow wireless charging of the mobile device 206.

Figure 20A:
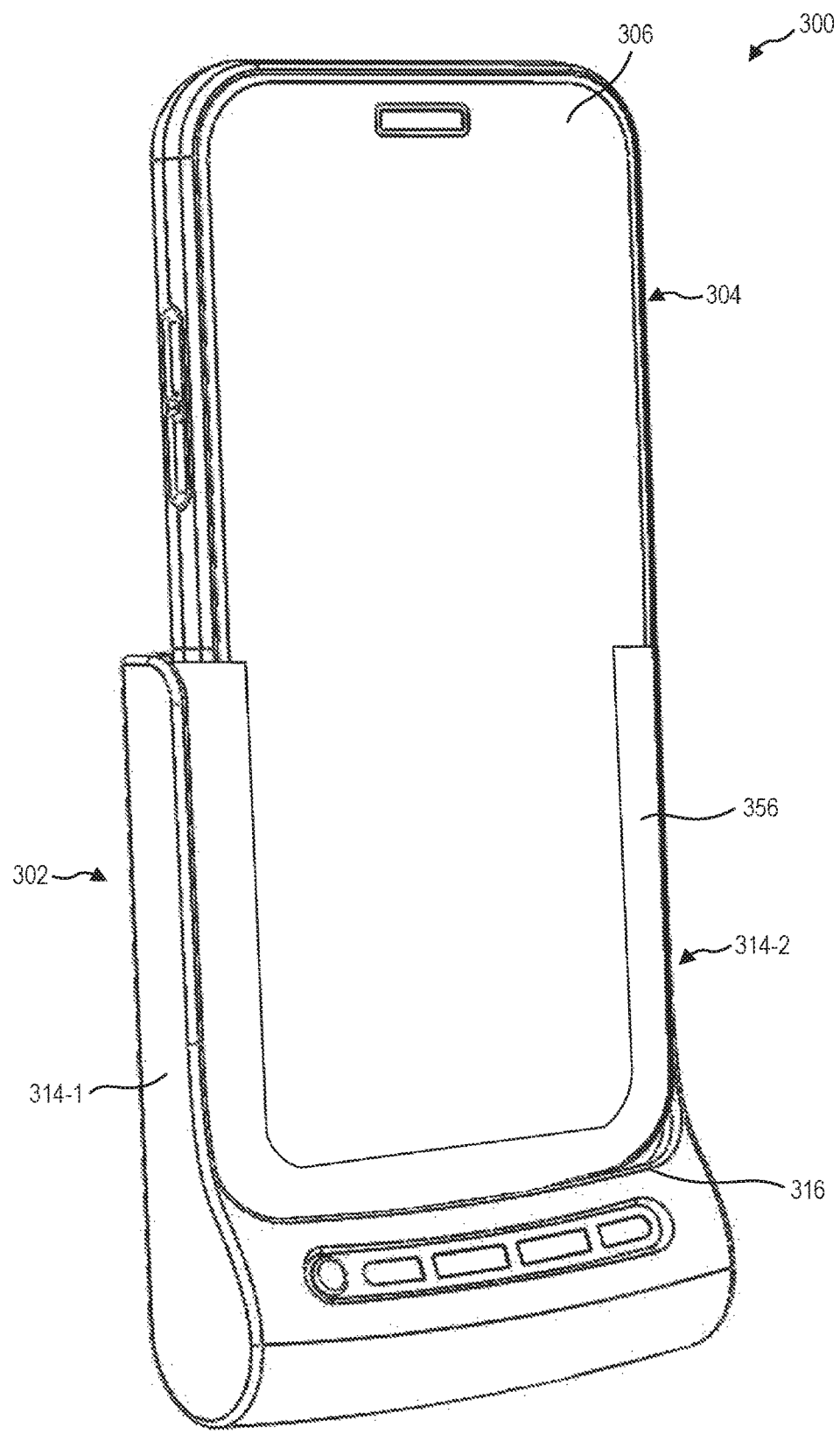
FIG. 20A is a front perspective view of an interim charging system, according to at least one embodiment of the present disclosure.

FIG. 20A is a perspective view of an interim charging system 300 with a plurality of lips 356 on a docking station 302, according to at least one embodiment of the present disclosure. The embodiments shown in FIGS. 20A and 20B may include similar features and elements as the embodiments shown in FIG. 18A, FIG. 18B, FIG. 19A, and FIG. 19B, where like numbers in those figures indicate like elements in FIG. 20A and FIG. 20B. In the embodiment shown, the first side wall 314-1, the second side wall 314-2, and the base 316 include a lip 356. The lip 356 may at least partially overlap the case 304 and/or the mobile device 306.

A lip 356 overlapping the case 304 and/or the mobile device 306 may help to secure the mobile device 306 to the docking station 302. This may help to prevent the mobile device 306 from being dislodged during use if the mobile device 306 and/or the entire interim charging system 300. For example, the mobile device 306 and/or the docking station 302 may experience a force normal or transverse to the docking station 302. The lip 356 may prevent the mobile device 306 from moving outwards and thereby becoming dislodged from the docking station 302. This may be advantageous in environments where the interim charging system 300 is subject to bouncing, jostling, bumping, or other regular, irregular, or unpredictable forces.

In the embodiment shown, the lip 356 extends from an entirety of a length of the first side wall 314-1, the second side wall 314-2, and the base 316. In other embodiments, the lip 356 may extend from only the first side wall 314-1, only the second side wall 314-2, or only the base 316. In still other embodiments, the lip 356 may extend from any combination of two of the first side wall 314-1, the second side wall 314-2, and the base 316. In yet other embodiments, the lip 356 may extend partially across one or more of the first side wall 314-1, the second side wall 314-2, and the base 316. In further embodiments, the lip 356 may be intermittent (e.g., include one or more gaps) across one or more of the first side wall 314-1, the second side wall 314-2, and the base 316. The extent of the lip 356 may be selected based on many factors, including strength of the lip, aesthetics, weight, ease of use, or other factor.

Figure 20B:
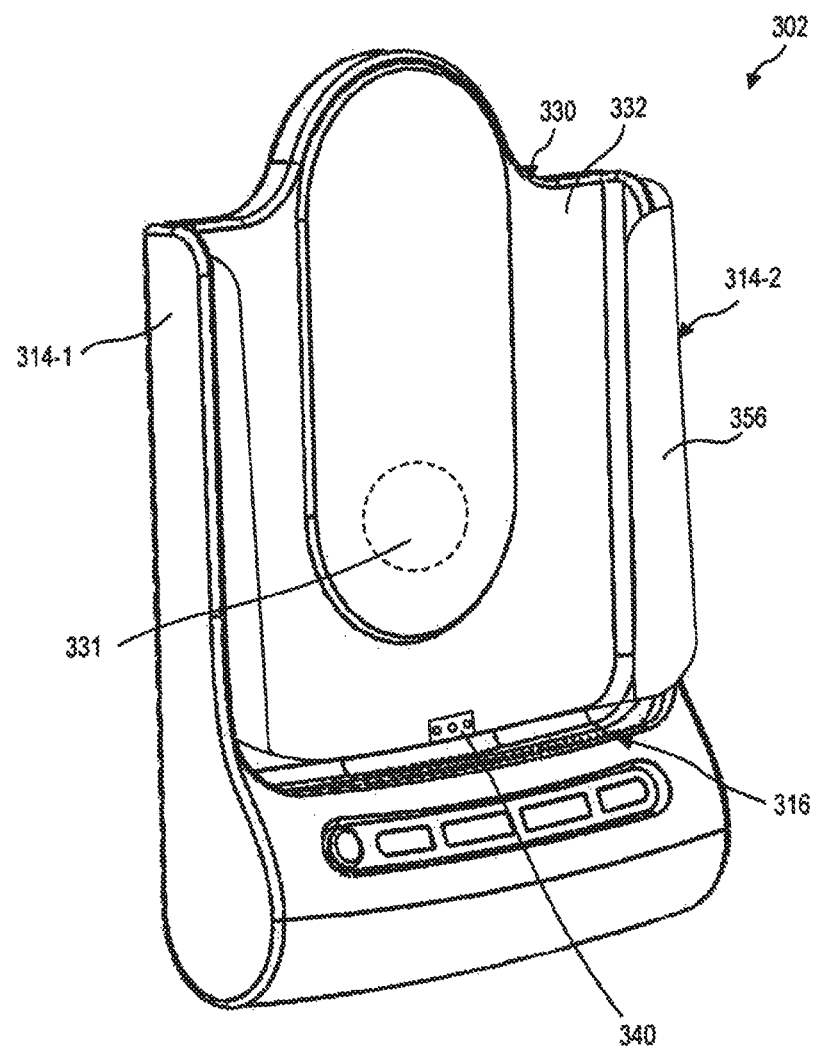
FIG. 20B is a perspective view of a case receiving device, according to at least one embodiment of the present disclosure.

FIG. 20B is a perspective view of the docking station 302 of FIG. 20A without the case 304 and the mobile device 306, according to at least one embodiment of the present disclosure. In the embodiment shown, the lip 356 is parallel to a back surface 332 of the mating surface 330. A parallel lip 356 to the back surface 332 may be very strong. For example, the mobile device (e.g., mobile device 306 of FIG. 20A) may be removed only with great force, which may plastically deform or break the lip 356. In this manner, the mobile device may be very securely connected to the docking station 302.

In other embodiments, the lip 356 may be transverse to the first side wall 314-1, the second side wall 314-2, and/or the base 316, but not parallel to the back surface 332. The lip 356 may be formed from an elastically deformable material. When the mobile device is installed and/or removed from the connected configuration, the lip 356 may provide some resistance to the removal force, but may elastically deform and allow the mobile device to be removed without breaking the lip 356. In other words, the mobile device may snap into an out of the mating surface 330. In this manner, the lip 356 may increase the removal force of the mobile device.

In some embodiments, the docking station 302 may magnetically secure to the mobile device to the docking station 302. For example, the docking station 302 may include a magnet 331. The magnet 331 may be magnetically connected to a magnetic portion of a case on the mobile device. In this manner, the magnet 331 and the lip 356 may cooperate to secure the case to the docking station 302.

The docking station 302 includes a charger 340. In the embodiment shown, the charger 340 is a physical connector, such as an APPLE LIGHTNING® connection, a micro-USB connection, a USB-C connection, a USB-B connection, a coaxial connection, other connection, or combinations of the foregoing. In the same or other embodiments, the charger 340 may include an induction charger as described above in reference to FIGS. 19A and 19B.

Figure 20C:
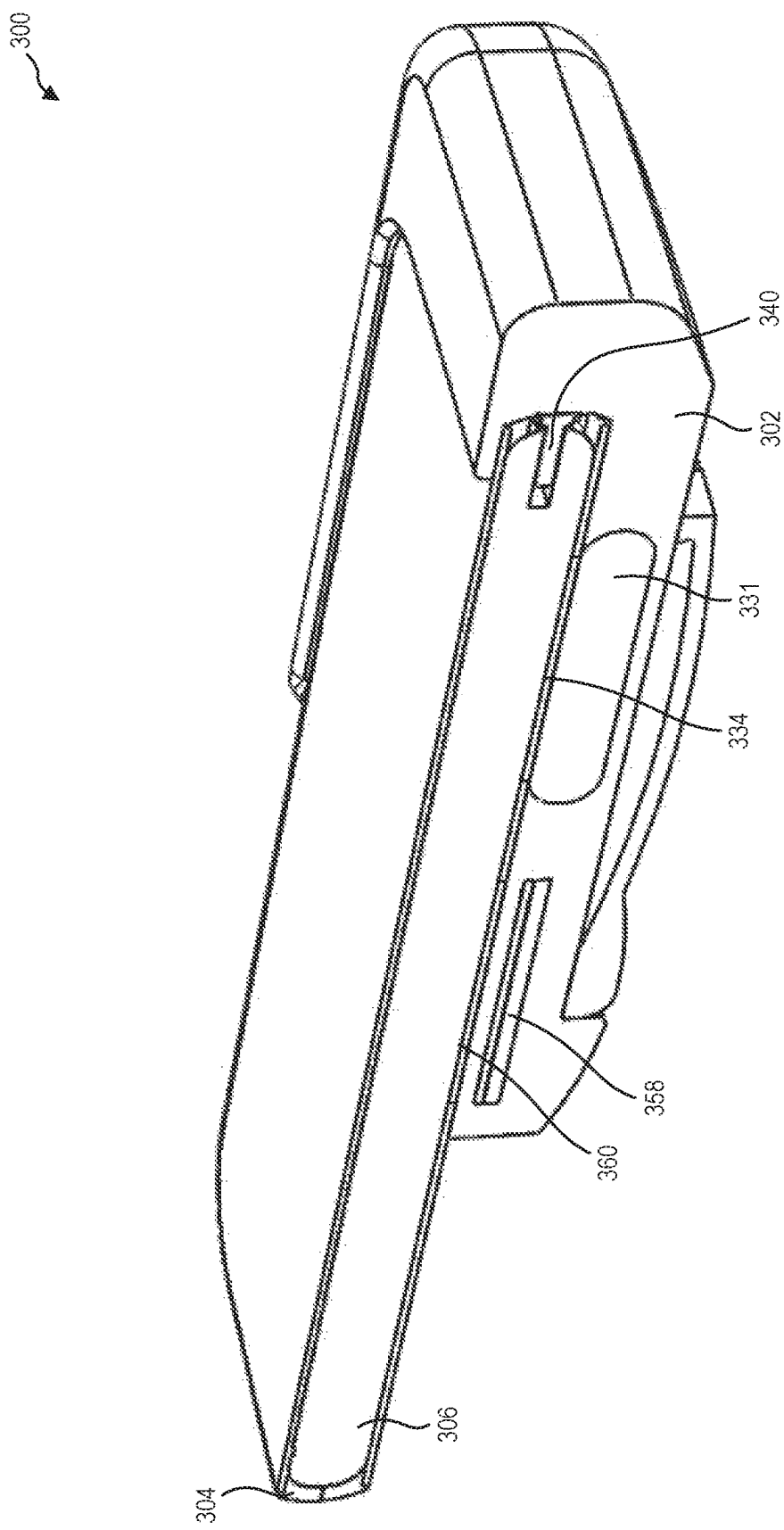
FIG. 20C is a cross-sectional view of the interim charging system, according to at least one embodiment of the present disclosure.

FIG. 20C is a cross-sectional view of the interim charging system 300 of FIG. 20A, according to at least one embodiment of the present disclosure. The docking station 302 includes a magnet 331 inside the body of the docking station 302. In other words, the magnet 331 is recessed within the docking station 302. The magnet 331 may be magnetically attracted to a magnetic portion 334 of the case 304. In other words, the magnet 331 may magnetically secure the case 304 to the docking station 302 using the magnetic attraction between the magnet 331 and the magnetic portion 334.

The case 304 at least partially envelops the mobile device 306. In other words, the mobile device 306 is located within and protected by the case 304. In some embodiments, the docking station 302 includes a charger 340 that may charge the mobile device 306. The docking station 302 may further include an inductive power charging coil 358. The inductive power charging coil 358 may transfer power from the power storage to the mobile device 306. For example, the inductive power charging coil 358 may transfer power to an inductive power receiving coil 360 located on the case 304. The inductive power receiving coil 360 may then transfer the power to the mobile device 306 via the charger 340. In some embodiments, the power receiving coil 360 may be located on the mobile device 306, and the inductive power charging coil 358 may directly charge the mobile device 306.

As used herein, the term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

As used herein, the phrase "based on" does not mean "based only on," unless expressly specified otherwise. In other words, the phrase "based on" describes both "based only on" and "based at least on."

One or more of the features, functions, procedures, operations, components, elements, structures, etc., described in connection with any one of the configurations described herein may be combined with one or more of the functions, procedures, operations, components, elements, structures, etc., described in connection with any of the other configurations described herein, where compatible.

In more detail, any of the features, functions, procedures, operations, components, elements, and structures, described with respect to any of the barcode readers 1100, 2500, or FIG. 18A may be utilized with any other barcode readers. Similarly any of the features, functions, procedures, operations, components, elements, and structures, described with respect to any of the docking stations 1300, 1400, 1600, 2100, 2000 may be utilized with any other docking station.

The steps and/or actions of the methods described herein may be interchanged with one another without departing from the scope of the claims. In other words, unless a specific order of steps or actions is required for proper operation of the method that is being described, the order and/or use of specific steps and/or actions may be modified without departing from the scope of the claims.

The claims are not limited to the specific implementations described above. Various modifications, changes and variations may be made in the arrangement, operation and details of the implementations described herein without departing from the scope of the claims.

What is claimed is:

1. A system for providing interim charging capability for a mobile device, comprising:
   a case for at least partially encapsulating the mobile device, wherein the case can at least partially encapsulate the mobile device and can be disconnected from the mobile device to not encapsulate any portion of the mobile device, the case including:
      a magnetic portion; and
      a power coupling circuit coupling to charging contacts on the mobile device;
   a docking station including:
      a mating surface;
      a magnet located at the mating surface, wherein the magnet magnetically secures the magnetic portion of the case to the docking station;
      a power storage;
      a device charging circuit coupling power from the power storage to the power coupling circuit to provide charging power to the mobile device while the mobile device is within the case; and a docking station charging circuit providing power to charge the power storage when the docking station charging circuit is coupled to an external power source.

2. The system of claim 1, wherein the case includes a case alignment feature and the docking station includes a docking station alignment feature, the case alignment feature and the docking station alignment feature being complementary, wherein a magnetic field between the magnet of the docking station and the magnetic portion of the case secures the case alignment feature to the docking station alignment feature.

3. The system of claim 2, wherein the case alignment feature includes a recess in the case and the docking station alignment feature includes a protrusion protruding from the mating surface, and wherein the recess includes the magnetic portion and the protrusion includes the magnet.

4. The system of claim 2, wherein:
the device charging circuit includes an inductive charging power coil;
the power coupling circuit includes an inductive charging receiving coil; and
the device charging circuit couples power from the power storage to the power coupling circuit through the inductive charging power coil when the case is aligned with the docking station.

5. The system of claim 2, wherein:
the device charging circuit includes a power contact and a ground contact;
the power coupling circuit includes a power receiving contact and a ground connection contact; and
the device charging circuit couples power from the power storage to the power coupling circuit through the power contact being in contact with the power receiving contact and the ground contact being in contact with the ground connection contact when the case is aligned with the docking station.

6. The system of claim 1, wherein a magnetic attraction between the magnet and the magnetic portion at least partially aligns the case with the docking station in a position where the device charging circuit becomes capable of coupling power to the power coupling circuit.

7. The system of claim 6, wherein:
the device charging circuit includes an inductive charging power coil;
the power coupling circuit includes an inductive charging receiving coil; and
the device charging circuit couples power from the storage to the power coupling circuit through the inductive charging power coil when the case is aligned with the docking station.

8. The system of claim 6, wherein:
the device charging circuit includes a power contact and a ground contact;
the power coupling circuit includes a power receiving contact and a ground connection contact; and
the device charging circuit couples power from the power storage to the power coupling circuit through the power contact being in contact with the power receiving contact and the ground contact being in contact with the ground connection contact when the case is aligned with the docking station.

9. The system of claim 1, wherein the docking station includes:
the mating surface, the magnet being located at the mating surface;
a first side surface transverse to the mating surface;
a second side surface opposite the first side surface and transverse to the mating surface; and
a base surface between the first side surface and the second side surface and transverse to the mating surface.

10. The system of claim 9, wherein a mating surface width between the first side surface and the second side surface is greater than or equal to a case width of the case.

11. The system of claim 10, wherein the first side surface includes a first side lip and the second side surface includes a second side lip, and wherein the first side lip and the second side lip secure the case to the mating surface in a connected configuration.

12. The system of claim 9, wherein the base surface includes a lip parallel to a back surface, and wherein the case includes a case base, the base surface receiving the case base in a connected configuration.

13. The system of claim 1, wherein the power storage can store power and be a source of stored power when not connected to an external power supply.

14. The system of claim 1, wherein the mobile device at least partially enclosed within the case is a barcode reader.

15. The system of claim 1, wherein the mobile device includes a camera for capturing an image of a barcode and a mobile application for decoding the image of the barcode.

16. The system of claim 15, wherein the mobile device includes an internal power storage.

* * * * *